(12) United States Patent
Deiss

(10) Patent No.: US 10,744,734 B2
(45) Date of Patent: *Aug. 18, 2020

(54) SEALING ELEMENT

(71) Applicant: ISO-Chemie GmbH, Aalen (DE)

(72) Inventor: Martin Deiss, Abtsgmuend (DE)

(73) Assignee: ISO-Chemie GmbH, Aalen (DE)

( * ) Notice: Subject to any disclaimer, the term of this patent is extended or adjusted under 35 U.S.C. 154(b) by 128 days.

This patent is subject to a terminal disclaimer.

(21) Appl. No.: 16/116,108

(22) Filed: Aug. 29, 2018

(65) Prior Publication Data

US 2019/0070828 A1    Mar. 7, 2019

(30) Foreign Application Priority Data

Sep. 1, 2017  (EP) ..................... 17189098

(51) Int. Cl.
  *B32B 3/26*    (2006.01)
  *E06B 1/62*    (2006.01)
  (Continued)

(52) U.S. Cl.
  CPC .............. *B32B 3/26* (2013.01); *B29C 53/04* (2013.01); *B32B 3/14* (2013.01); *B32B 5/18* (2013.01); *B32B 7/12* (2013.01); *B32B 27/065* (2013.01); *B32B 37/20* (2013.01); *B32B 38/0004* (2013.01); *B65H 18/28* (2013.01); *C09J 7/00* (2013.01); *E04B 1/6812* (2013.01); *E04F 21/0015* (2013.01); *E04F 21/0038* (2013.01);
  (Continued)

(58) Field of Classification Search
  CPC .... B32B 3/26; B32B 3/14; B32B 5/18; B32B 7/20; B32B 38/0004; B32B 7/12; B32B 27/065; B32B 2307/7244; B32B 2307/7246; B32B 2405/00; B32B 2001/628; B32B 2581/00; B32B 2307/7265; E06B 1/62; E06B 2001/626; E04B 1/6812; B29C 53/04; B65H 18/28; C09J 7/00; E04F 21/0015; E04F 21/0038; F16J 15/021
  See application file for complete search history.

(56) References Cited

U.S. PATENT DOCUMENTS

| 4,401,716 A | 8/1983 | Tschudin-Mahrer |
| 2010/0003465 A1 | 1/2010 | Deiss |

(Continued)

FOREIGN PATENT DOCUMENTS

| DE | 20 2013 100308 U1 | 4/2014 |
| EP | 2 620 565 A1 | 7/2013 |
| EP | 2 990 552 A1 | 3/2016 |

OTHER PUBLICATIONS

EP 17 18 9098 Search Report dated Feb. 21, 2018.

*Primary Examiner* — Michael C Miggins
(74) *Attorney, Agent, or Firm* — Jansson Munger McKinley & Kirby Ltd.

(57) ABSTRACT

A sealing element of flexible foam which includes at least three sealing tape sections which are arranged next to each other in a functional direction of the sealing element. At least one first barrier layer section and at least one second barrier layer section are each accommodated between two adjacent sealing tape sections. The barrier layer sections connect the adjacent sealing tape sections to each other. The first barrier layer section forms a loop in an area of the bottom surface of the sealing element and the second barrier layer section forms a loop in an area of the top surface of the sealing element.

4 Claims, 15 Drawing Sheets

(51) Int. Cl.
- *E04B 1/68* (2006.01)
- *B29C 53/04* (2006.01)
- *B32B 3/14* (2006.01)
- *B32B 5/18* (2006.01)
- *B65H 18/28* (2006.01)
- *C09J 7/00* (2018.01)
- *E04F 21/00* (2006.01)
- *B32B 37/20* (2006.01)
- *B32B 38/00* (2006.01)
- *B32B 7/12* (2006.01)
- *B32B 27/06* (2006.01)
- *F16J 15/02* (2006.01)

(52) U.S. Cl.
CPC ........ *E06B 1/62* (2013.01); *B32B 2307/7244* (2013.01); *B32B 2307/7246* (2013.01); *B32B 2307/7265* (2013.01); *B32B 2405/00* (2013.01); *B32B 2581/00* (2013.01); *E06B 2001/626* (2013.01); *E06B 2001/628* (2013.01); *F16J 15/021* (2013.01)

(56) References Cited

U.S. PATENT DOCUMENTS

| | | |
|---|---|---|
| 2010/0009118 A1 | 1/2010 | Deiss |
| 2016/0059536 A1 | 3/2016 | Deiss |
| 2016/0060068 A1 | 3/2016 | Deiss |

SEALING ELEMENT

CROSS REFERENCE TO RELATED APPLICATION

This application claims priority to European Patent Application No. EP 17 189 098.1, filed Sep. 1, 2017, the entire contents of which are incorporated by reference in its entirety.

FIELD OF THE INVENTION

The present invention relates to a sealing element and to a method for the production of a sealing tape roll of flexible, compressible foam with at least one barrier layer extending in the radial direction.

Sealing tapes unwound from sealing tape rolls are usually used to seal joints such as those between a frame profile of a window or a door and a building wall to seal the joints against drafts and driving rain. Films additionally provided on a lateral surface of the sealing tape increase the impermeability of the tape to water vapor; see, for example, U.S. Pat. No. 4,401,716, US 2010/009118 A1 and US 2010/003465 A1. Because these films, which are applied externally to the sealing tape, suffer from the disadvantage that they can be damaged during the transport or installation of the sealing tape, it is now common practice for films forming a barrier layer to be arranged inside the sealing tape.

Various methods are known for the production of sealing tapes with barrier layers on the inside. These methods involve the introduction of films or similar materials capable of forming a barrier layer into a sealing tape. US 2016/060068 A1, for example, describes a method in which at least two foam strips are provided. One of the side surfaces of one of the foam strips is provided with a film strip and with an adhesive tape strip or an adhesive-like fluid medium. The two foam strips are then brought together in such a way that a foam-barrier layer web is obtained, in which a barrier layer is arranged between adjacent foam strips, the barrier layer being formed by the film strip and the adhesive strip or adhesive-like fluid medium. In this method, it has been found disadvantageous that a considerable amount of effort is required to make available individual foam strips equipped with barrier layer material. The larger the number of barrier layers which the sealing tape is intended to have, the greater this effort.

US 2016/059536 A1 describes an alternative method for the production of sealing tape rolls with an interior barrier layer. In this method, a foam web is produced first. Then a plurality of cuts extending in the longitudinal direction is made in the foam web to form parallel foam strips. Then a film strip and an adhesive tape strip or an adhesive-like fluid medium are introduced into each of the intermediate spaces between two adjacent foam strips produced by the cuts. All of the foam strips are bonded together to produce a foam-barrier layer web, in which the foam strips and the at least one barrier layer alternate. It is sometimes difficult to introduce the barrier layer material reliably into the very narrow intermediate spaces and to ensure that the material is distributed uniformly over the entire thickness of the foam web or of the foam strips. It is possible only with considerable difficulty to check the introduced barrier layer after the material has been introduced. In addition, complicated deflection devices must be provided to introduce a film strip into an intermediate space formed by a cut, for example.

OBJECTS OF THE INVENTION

It is an object of the present invention to provide a sealing element and a method for the production of a sealing tape roll with at least one interior, radially oriented barrier layer which makes it possible to produce a sealing tape roll reliably, easily, and at low cost.

SUMMARY OF THE INVENTION

According to an aspect of the invention, the method for producing a sealing tape roll out of flexible, compressible foam with at least one barrier layer extending in the radial direction and arranged axially between two layers of foam comprises the steps of: (1) providing a foam web consisting of flexible foam; (2) applying a first barrier layer to a first surface of the foam web; (3) introducing at least one first cut into the first surface of the foam web in a longitudinal direction of the foam web and introducing at least one second cut into a second surface of the foam web opposite the first surface in a longitudinal direction of the foam web and offset from the at least one first cut in a transverse direction of the foam web to form parallel sealing tape strips, wherein a connecting section remains between two adjacent sealing tape strips; (4) folding over the sealing tape strips in the area of the connecting sections to produce a foam-barrier layer web in such a way that subsections of the first surface, each of which is adjacent to a common connecting section, are opposite each other, and subsections of the second surface, each of which is adjacent to a common connecting section, are opposite each other; and (5) winding up the foam-barrier layer web to form a sealing tape roll with at least one barrier layer extending in the radial direction, or winding up the foam-barrier layer web to form an intermediate roll and cutting through the intermediate roll at one or more points in the axial direction to produce a plurality of sealing tape rolls, each of which has at least one barrier layer extending in the radial direction, which rolls are narrower than the intermediate roll; or introducing at least one cut into the foam-barrier layer web in a longitudinal direction of the foam-barrier layer web to form foam-barrier layer strips and winding up the foam-barrier layer strips into individual sealing tape rolls, each of which has a barrier layer extending in the radial direction.

A "first cut" in the present context is a cut which is introduced into the first surface of the foam web. A "second cut" is a cut which is introduced into the second surface of the foam web. The terms "first" and "second" are not intended to specify a chronological sequence for the production of the cuts in the foam web. For example, it is possible that a second cut could be made before a first cut. All of the cuts could also be made in the foam web simultaneously.

The method makes it possible to apply a barrier layer easily, efficiently, and easily verifiably to a foam web and then, by cutting and folding over the individual sealing tape strips along the connecting sections, to have this barrier layer arranged in the interior of a foam-barrier layer web. At the same time, no considerable effort is required to provide a plurality of foam strips with barrier layers and thus to produce foam-barrier layer webs with any desired number of interior barrier layers, from which in turn sealing tape rolls with any desired number of interior barrier layers can be easily formed.

The method preferably comprises the application of a second barrier layer to the second surface of the foam web. The second barrier layer can also be applied just as easily, efficiently, and easily verifiably as the first barrier layer to the foam web and thus makes it easy to increase the number of interior barrier layers in the foam-barrier layer web. The second barrier layer can consist of the same material as the first barrier layer or can be made of a different material.

It is also preferred that at least two first cuts and/or at least two second cuts be introduced into the foam web in such a way that, when seen in the transverse direction of the foam web, a first cut and a second cut are present in the foam web in alternation. This means that, in the transverse direction of the foam web, a second cut is arranged between two first cuts and/or a first cut is arranged between two second cuts. As a result, after the sealing tape strip has been folded over, a foam-barrier layer web is obtained in which the subsections of the first surface adjacent to a common connecting section are opposite each other, and the subsections of the second surface adjacent to a common connecting section are opposite each other.

The at least one first cut and the at least one second cut are preferably introduced at uniform distances from each other in the transverse direction of the foam web to produce sealing tape strips of uniform width. After the sealing tape strips have been folded over in the area of the connecting sections, the foam-barrier layer web thus comprises a uniform height or thickness and is extremely well-adapted to further processing into a sealing tape roll. It is obvious, however, that the cuts can also be introduced at unequal distances from each other in order to produce in this way a profiled foam-barrier layer web.

In one embodiment, in which a second barrier layer is applied to the second surface, the at least one first cut can pass all the way through the foam web, so that the at least one connecting section in the area of the second surface is formed by the second barrier layer alone. The at least one second cut does not, in this case, pass all the way through the foam web, so that the at least one connecting section in the area of the first surface comprises a foam bridge.

Alternatively, the at least one first cut does not pass all the way through the foam web, so that the at least one connecting section in the area of the second surface comprises a foam bridge, and the at least one second cut passes all the way through the foam web, so that the at least one connecting section in the area of the first surface is formed by the first barrier layer alone. If desired, a second barrier layer can be applied, or not, to the second surface.

In another alternative embodiment, neither the at least one first cut nor the at least one second passes all the way through the foam web, so that the at least one connecting section in the area of the first surface comprises a foam bridge, and the at least one connecting section in the area of the second surface also comprises a foam bridge. If desired, a second barrier layer can be applied to the second surface, or not.

Finally, in another alternative embodiment in which a second barrier layer is applied to the second surface, both the at least one first cut and the at least one second cut pass all the way through the foam web, so that the at least one connecting section in the area of the first surface is formed by the first barrier layer alone, and the at least one connecting section in the area of the second surface is formed by the second barrier layer alone.

It can be seen that there are many different possible variations here, from which the skilled person can choose. Thus, the properties of the foam-barrier layer web, especially those pertaining to the number and arrangement of the barrier layers, the distribution of the barrier layers within the foam-barrier layer web, and their extension through the foam-barrier layer web, can be adapted as desired without causing any significant increase in the complexity of the production method.

Depending on the depth of the at least one first cut and/or of the at least one second cut, a foam bridge remains, if desired, between two adjacent foam strips, the thickness of which can be selected. So that it is easy to fold the sealing tape over along the connecting sections, the connecting sections should be made as thin as possible. The thinnest-possible connecting sections are formed by the first and/or the second barrier layer alone. But because it is possible that these can be cut through even if there is only a slight error during the cutting operation, it is advisable to allow thin foam bridges to remain when the cuts are made, which bridges will then contribute their part to the connecting sections.

The at least one foam bridge preferably has a maximum thickness of 10 mm, more preferably a maximum of 5 mm, and even more preferably a maximum of 1-2 mm.

In a preferred embodiment, the method comprises the step of applying an additional material, wherein the additional material is applied to the first surface of the foam web and/or to the second surface of the foam web and/or to the first barrier layer and/or to the second barrier layer. This additional material can give the sealing tape special properties.

The cutting-through of the intermediate roll according to alternative (ii) or the introduction of the at least one cut according to alternative (iii) are preferably carried out on a foam strip of the intermediate roll in the former case and on a foam strip of the foam-barrier layer web in the latter case. Damage to the at least one interior barrier layer is thus avoided.

The method preferably comprises, after the folding-over step, the bonding-together of the opposing subsections of the first or second surface of the sealing tape strips which have been provided with the first barrier layer or the second barrier layer. Thus a cohesive foam-barrier layer web can be created, in which there is no danger that the sealing tape strips can unfold undesirably during the further course of the method. This simplifies further processing. In addition, the bonding-together of the sealing tape strips ensures that the sealing tape rolls produced from them later will have sufficient cohesion in the axial direction.

It is preferred here that, before the sealing tape strips are bonded together, the sealing tape strips be heated, so that the adhesion of the first barrier layer and/or of the second barrier layer is increased for the sake of the bond between the sealing tape strips, wherein the heating is preferably conducted before the sealing tape strips are folded over. As a result, the material of the first barrier layer and/or of the second barrier layer is brought into a state in which it is adapted to the bonding together of the foam strips which are adjacent to each other. In particular after the cooling of the barrier layers, a cohesion between the foam strips is created which preferably requires no additional bonding material such as an adhesive. The heating before the folding-over of the sealing tape strips offers the advantage that the first and/or the second barrier layer can be heated uniformly over a large surface area of the foam web. It is also conceivable, however, that the sealing tape strips could be heated after they have been folded over. In this case, only sections of the first and/or of the second barrier layer at the edges of the foam-barrier layer web are heated appropriately. The heating can also be carried out in such a way, however, that the first and/or the second barrier layer in the interior of the foam-barrier layer web is heated appropriately. The bonding-together step preferably also comprises the step of pressing the foam strips at least lightly together.

An adhesive layer can be applied to a surface of the foam-barrier layer web or to a surface of the foam-barrier layer strips oriented transversely to the barrier layers. This adhesive layer is preferably formed by a double-sided adhesive tape, which is covered on an outside surface by a protective film which can be peeled off. The adhesive layer increases the cohesion of the sealing tape strips and leads advantageously to the result that the sealing tape rolls produced later from them comprise an outward-facing adhesive layer, by which the strips can be applied quickly and easily to the frame profile of a window or door frame.

In another aspect of the invention, the method for producing a sealing tape roll of flexible, compressible foam with a barrier layer extending in the radial direction which is arranged axially between two layers of foam comprises the steps of: (1) providing a foam web consisting of a flexible foam; (2) applying a barrier layer to a first surface of the foam web; (3) introducing a cut into a second surface of the foam web opposite the first surface in a longitudinal direction of the foam web to form parallel sealing tape strips, wherein a connecting section remains between the sealing tape strips; (4) folding over the sealing tape strips in the area of the connecting section to produce a foam-barrier layer web, such that two subsections of the first surface adjacent to the connecting section are opposite each other; and (5) winding up the foam-barrier layer web into a sealing tape roll with a barrier layer extending in the radial direction.

In this way, it is also possible to produce easily a sealing tape roll or a foam-barrier layer web with precisely one interior barrier layer.

According to another aspect of the invention, the sealing element comprises a top surface, a bottom surface, and two side surfaces connecting the top and bottom surfaces and also comprises at least three sealing tape sections, which are arranged next to each other in a functional direction of the sealing element, wherein the functional direction is parallel to the top surface and to the bottom surface and perpendicular to the side surfaces, and at least one first barrier layer section and at least one second barrier layer section, each of which is accommodated between two adjacent sealing tape sections. The at least one first barrier layer section and the at least one second barrier layer section each connect the adjacent sealing tape sections to each other and extend parallel to the side surfaces in the sealing element. The at least one first barrier layer section and the at least one second barrier layer section each form a loop between the adjacent sealing tape sections, wherein the at least one first barrier layer section forms the loop in the area of the bottom surface of the sealing element, and the at least one second barrier layer section forms the loop in the area of the top surface to sealing element.

Since the sealing tape sections are folded over in the area of connecting sections, a sealing tape is thus provided which can be produced especially easily and cheaply. Previously formed barrier layer sections are arranged inside the sealing element. When the sealing tape sections are folded over in the area of the connecting sections, the loop is formed in the at least one first and/or in the at least one second barrier layer section.

The sealing element preferably comprises several first and/or several second barrier layer sections, wherein, when seen in the functional direction, a first barrier layer section and a second barrier layer section always occur in alternation. Thus it is also possible to provide sealing elements of considerable width containing a plurality of interior barrier layer sections.

It is preferable for the at least one first barrier layer section and the at least one second barrier layer section to comprise a film. A film is especially well adapted to the formation of a connecting section between two sealing tape sections and to the formation of a barrier layer within the sealing element. Above all, films can be used effectively to adapt the sealing properties of the sealing element to the given requirements, in particular with respect to the resistance to the diffusion of water vapor.

Each loop preferably comprises two substantially parallel legs and a curved part which connects the legs, wherein the two legs are bonded to each other. As a result, the sealing tape sections adjacent to the loop are securely bonded together.

DETAILED DESCRIPTION OF SPECIFIC EMBODIMENTS

Figure 1A:
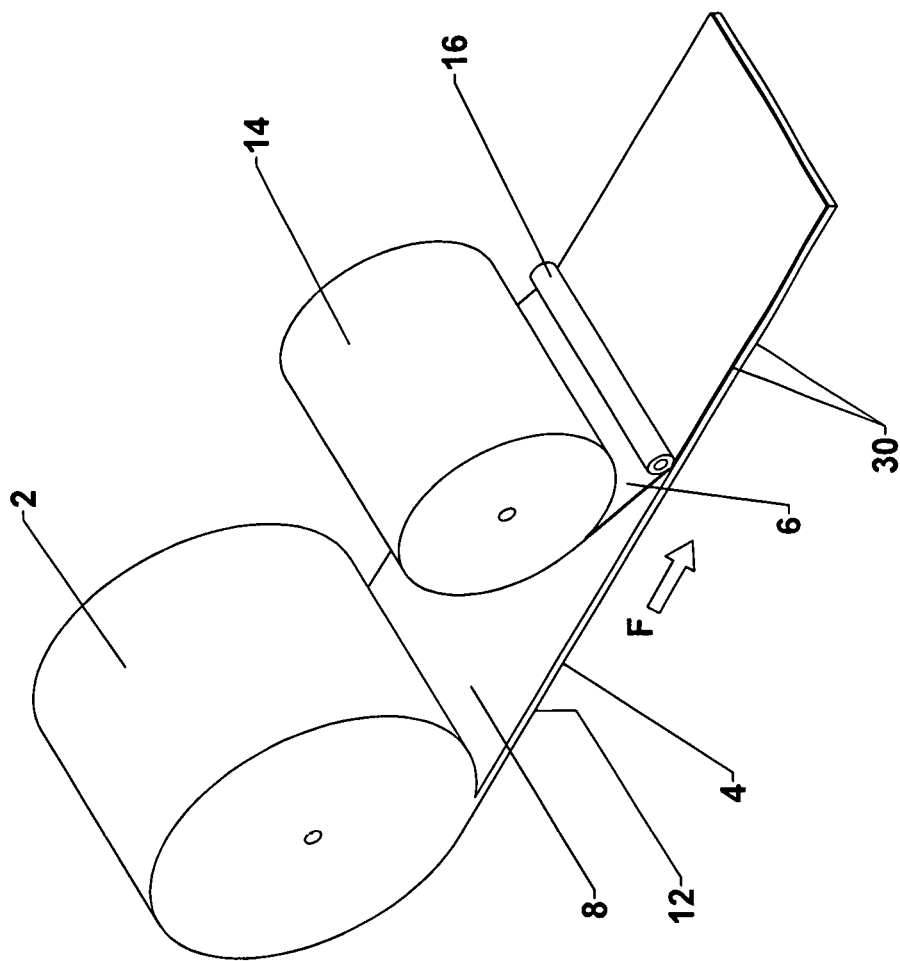
FIG. 1a shows by way of example the step of applying a first barrier layer to a first surface of a foam web.

FIG. 1a shows the first steps of an exemplary embodiment of the method according to the invention. A flexible foam in the form of a wound-up foam web 4 is provided on an output roll 2. The flexible foam is provided on output roll 2 in long lengths of up to 500 m, preferably of 3-300 m, and more preferably of 5-200 m. Any of the known, open-cell, mixed-cell, or closed-cell flexible foams can be used which recover after compression such as foams made of, for example, polyurethane, polyethylene, polyvinyl chloride, or polypropylene. The foam web 4 can already be impregnated in the known manner prior to processing to delay its recovery.

Because it is provided on output roll 2, the foam web can be very easily transported and processed. Foam web 4 is usually present on output roll 2 in an uncompressed or only slightly compressed state. It is also possible that foam web 4 on output roll 2 could be in a compressed state, but then, after it has been unwound from the output roll, it must be ensured that the foam material has had enough chance to recover properly before processing. The width of foam web 4 is usually in the range between 1 cm and 5 m, preferably in the range of 0.5-1.5 m. The thickness of foam web 4 in the relaxed state is usually in the range between 5 mm and 30 cm, preferably in the range between 10 mm and 10 cm.

After it has been unwound from output roller 2, foam web 4 is moved in a conveying direction, indicated by the arrow F. Then a first barrier layer 6 is applied to a first surface 8 of foam web 4 to form in this way a laminated foam web. In the embodiment shown, the first surface is formed by the upward-facing surface of foam web 4.

As an option, a second barrier layer 10 (not shown) could also be applied to a second surface 12 of the foam web opposite first surface 8 after the foam web has been unwound from output roll 2. Second surface 12 corresponds, in the present case, to the bottom surface of foam web 4. The method according to the invention is described in the following by reference to an embodiment in which first barrier layer 6 and second barrier layer 10 are provided. It is obvious that all features not described explicitly in the following as being dependent on the second barrier layer or as properties of it will also be applicable in cases where only first barrier layer 6 is used.

In the embodiment shown in FIG. 1*a*, first barrier layer 6 is formed by a film web, which is provided on a film supply roll 14. Second barrier layer 10 can also be formed by a film web also provided on a film supply roll. First barrier layer 6 formed as a film web is preferably applied from above onto first surface 8 of foam web 4. Second barrier layer 10 is then, correspondingly, applied from below to second surface 12 of foam web 4. The application of first barrier layer 6 and optionally of second barrier layer 10 is usually conducted in the area of a bonding unit, which is indicated schematically by the roller 16. The application of first barrier layer 6 and of second barrier layer 10 usually comprises the bonding of barrier layer 6, 10 in question to foam web 4, wherein the bonding step in turn comprises a step of applying heat and/or a step of pressing barrier layer 6, 10 and foam web 4 against each other. When a film web is used, the bonding to foam web 4 in the bonding unit is preferably achieved by lamination.

First barrier layer 6 and second barrier layer 10 can each be formed by a web of a single-sided or double-sided adhesive tape. The adhesive side of an adhesive tape of this type is then usually provided with a peel-off film, which is removed shortly before application to foam web 4. First barrier layer 6 and second barrier layer 10 can also be formed by a film web which itself comprises a layer of adhesive tape or a solid layer of a hot-melt adhesive. Finally, an adhesive-like fluid medium can be applied by nozzles (e.g., a melt nozzle, a flat nozzle, a mixing nozzle) or by roller application (transfer roller) to foam web 4 to form first barrier layer 6 and second barrier layer 10. Depending on the adhesive, the barrier layers can then be bonded to foam web 4, preferably in a bonding unit, wherein the adhesive is usually cured. Chemical and physical types of solidification can in principle be considered. Here, too, the bonding of first barrier layer 6 or of second barrier layer 10 to foam web 4 will again usually comprise a step of heat application and/or a step of pressing first barrier layer 6 or second barrier layer 10 together with foam web 4. It is also possible to apply a spray adhesive to one side of the film web and to use this combination as first barrier layer 6 and second barrier layer 10. Finally, a skin of the foam material of foam web 4 itself can serve as the barrier layers 6, 10 if the foam web is partially melted on the appropriate side and then allowed to solidify again or if foam web 4 already has a skin as a result of the way in which it is produced.

Each step of heat application as mentioned above is carried out by a heating device, usually configured as a hot-air blower. Radiant heating can also be used, however, such as heating by an infrared heater or microwave heater.

It is also conceivable that first barrier layer 6 and second barrier layer 10 could be applied only to parts of corresponding first surface 8 and second surface 12, respectively. First and second barrier layers 6, 10 can also be each configured as multiple parts and cover first and second surfaces 8, 12 either completely or partially. For example, individual strips of a barrier layer can be applied in the longitudinal direction to the first and/or second surface 8, 12. It is also possible to use different materials for first and second barrier layers 6, 10. If first or second barrier layer 6, 10 consists of multiple parts, the individual components of first or second barrier layer 6, 10 can also be made of different materials. It is possible in this way to provide a large number ways in which the properties can be effectively adapted to the given requirements.

The function of first barrier layer 6 and, if present, of second barrier layer 10 is preferably to reduce or to prevent the passage of air and/or water vapor. First barrier layer 6 and second barrier layer 10 can also be configured with "humidity variability". This means that it changes its resistance to the diffusion of water vapor as a function of the ambient humidity. Plastic films of, for example, polyolefins, polyurethane, polyvinyl chloride, polystyrene, polycarbonate, polyamide, or similar plastics as well as bioplastics, multilayer films (coex films) made of various plastics, physically curing adhesives such as acrylate-based dispersion adhesives, hot-melt or similar adhesives, polycondensation adhesives such as silicones, hybrid polymers, and the like are especially suitable for the first and second barrier layers.

It is also possible for a foam web 4 which has already been produced and already laminated with a first barrier layer 6 and/or a second barrier layer 10 to be wound up on output roll 2.

It can also be desirable to apply an additional material (not shown). The additional material can be already bonded to first barrier layer 6 and/or to second barrier layer 10, if present, and thus applied to foam web 4 in a single step together with corresponding barrier layers 6, 10. Alternatively, the additional material can be applied over the entire surface or only stripwise even before first barrier layer 6 and second barrier layer 10 have been applied to first surface 8 and/or second surface 12 of foam web 4. The additional material can also be applied externally over the entire surface or only stripwise to barrier layer 6, 10 in question only after first barrier layer 6 and second barrier layer 10 have been applied. Materials for fire safety (e.g., expanded graphite, incombustible solids, CO2 emitters, etc.) can be considered in particular for use as additional material. Materials for insulation (e.g., PU foam, resins, sealants, etc.), materials for sealing against moisture (e.g., hydrophobic or hydrophilic substances, substances which swell on contact with water, etc.), materials for sound damping, materials for controlled ventilation (e.g., catalysts, etc.), materials for hygienic purposes (e.g., disinfectants, etc.) and/or materials for triggering the expansion of the sealing tape (e.g., blowing agents, heat sources, etc.) can be considered. With respect to both the arrangement and the type and properties of the additional materials, the skilled person will identify alternatives which can be used to fulfill the requirements in question.

Figure 1B:
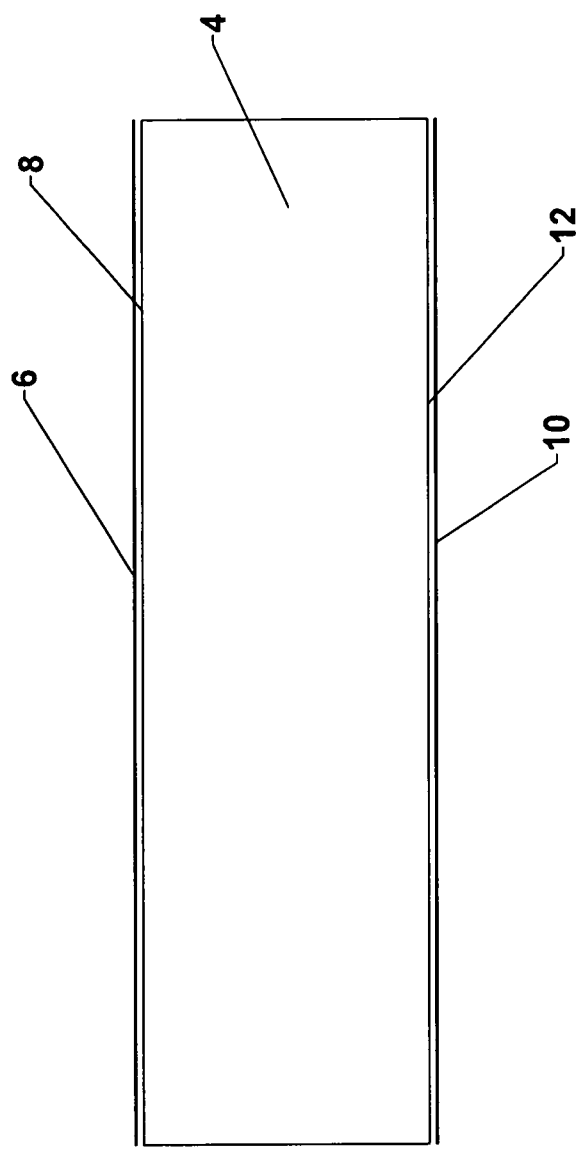
FIG. 1b shows a schematic, cross-sectional view of a foam web, onto which a first and a second barrier layer have been applied.

FIG. 1b shows a schematic cross-sectional view of foam web 4 after the application of first barrier layer 6 to first surface 8 and of second barrier layer 10 to second surface 12 of foam web 4.

In the following, the additional steps of an exemplary embodiment of the method according to the invention will be described on the basis of FIGS. 2-5, wherein, in these cases, a first and a second barrier layer 6, 10 are provided. As previously mentioned, second barrier layer 10 is optionally provided on second surface 12 and can be omitted. In that case, the same method steps are also applicable when only first barrier layer 6 is provided on first surface 8 of foam web 4. The only difference is that fewer barrier layers are formed in the end product.

Figure 2:
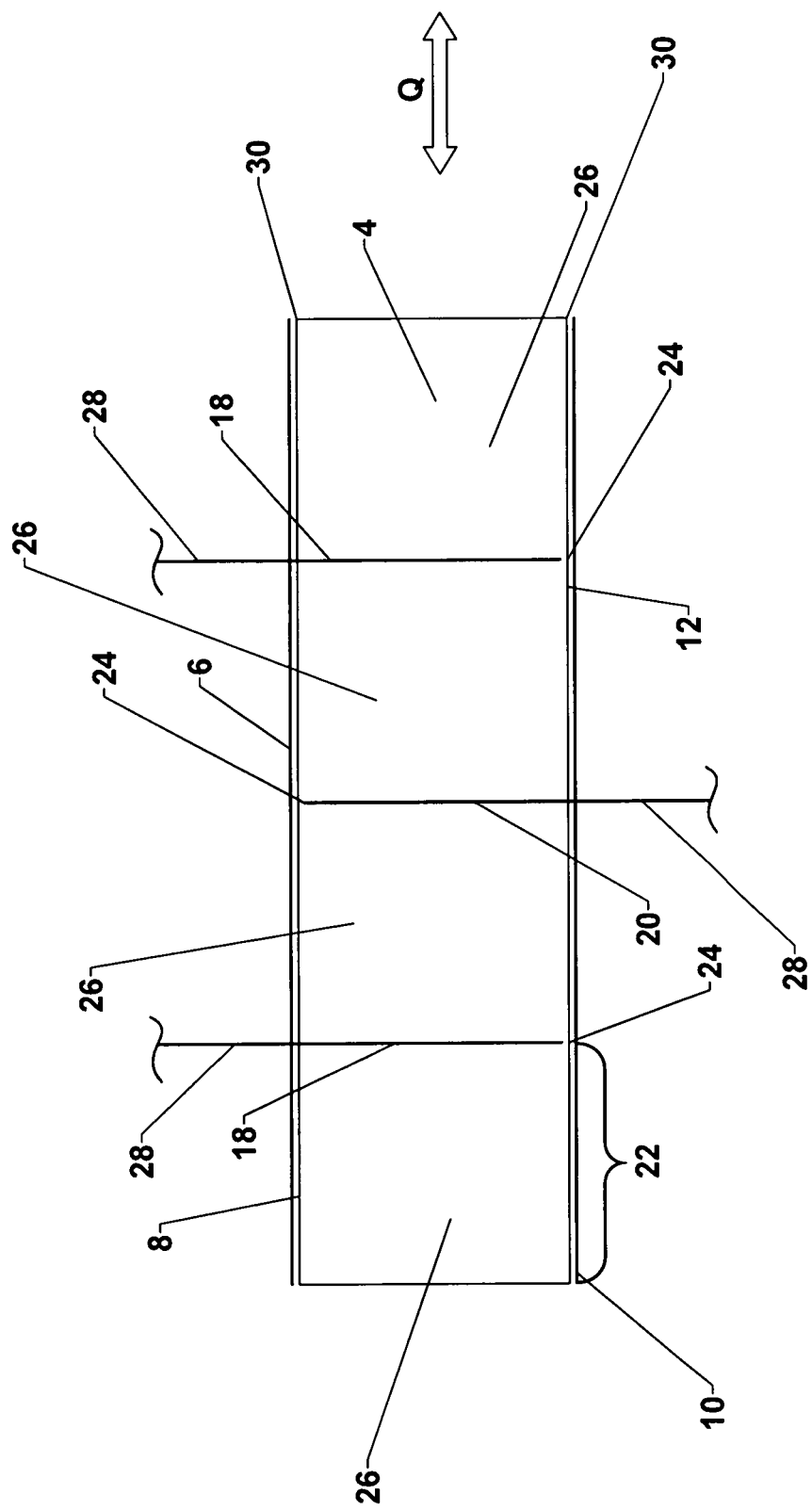
FIG. 2 shows a schematic cross-sectional view of the step of introducing first and second cuts into the foam web of FIG. 1b.

It can be seen in FIG. 2 how at least one first cut 18 (here, two cuts 18) is made in first surface 8 of foam web 4 in a longitudinal direction of foam web 4, namely, a direction which is perpendicular to the plane of the drawing. At least one second cut 20 (here two second cuts 20) is made in second surface 12 of foam web 4 in the longitudinal direction of foam web 4 and offset in a transverse direction of foam web 4 from the at least one first cut 18. The longitudinal direction is parallel to the conveying direction F. The transverse direction of foam web 4 is indicated in FIG. 2 by the arrow Q. If the section of first surface 8 in the area of the first cut is covered by first barrier layer 6, this layer is, logically, cut through. The same relationship applies to second cuts 20 in second surface 12 and second barrier layer 10.

As a result of the introduction of the at least one first cut 18 and the at least one second cut 20, parallel sealing tape strips 22 are formed, wherein a connecting section 24 remains between two adjacent sealing tape strips 22. Each sealing tape strip 22 is formed by a foam strip 26 and the subsections of first barrier layer 6 and of second barrier layer 10 applied to it.

The at least one first cut 18 and the at least one second cut 20 are preferably introduced by knives 28, more preferably by parallel knives 28, into foam web 4 in the longitudinal direction of the foam web 4 and preferably parallel to the longitudinal edges 30 of the web. The longitudinal edges 30 are the edges of the foam web 4 which are parallel to the conveying direction F and orthogonal to the axial direction of the output roll 2. To introduce the at least one first cut 18 and the at least one second cut 20 into the foam web 4, any other method for cutting foam webs 4 known to the skilled person such as sawing can be used as an alternative to the knives 28.

The at least one first cut and the at least one second cut can each pass all the way through foam web 4. It is also possible for them not to pass all the way through foam web 4, in which case a foam bridge remains behind between two adjacent foam strips 26.

Regardless of whether a second barrier layer 10 is provided or not, the at least one second cut 20 can pass completely through foam web 4 or not pass all the way through it. In the case that the at least one second cut 20 passes all the way through foam web 4, the at least one connecting section 24 in the area of first surface 8 is formed by first barrier layer 6 alone. If the at least one second cut 20 does not pass all the way through foam web 4, the at least one connecting section 24 in the area of first surface 8 is formed by a foam bridge and first barrier layer 6.

In regard to the at least one first cut 18, a distinction is made between whether a second barrier layer 10 is provided or not. Only when second barrier layer 10 is applied to second surface 12 of foam web 4 can the at least one first cut 18 be introduced into the foam web in such a way that it passes all the way through it. The at least one connecting section 24 in the area of second surface 12 is then formed by second barrier layer 10 alone. If the at least one first cut 18 does not pass all the way through the foam web, so that a foam bridge remains behind between adjacent foam strips 26, the at least one connecting section 24 in the area of second surface 12 comprises this foam bridge. If a second barrier layer 10 is present, then the at least one connecting section 24 in the area of second surface 12 also comprises second barrier layer 10.

In view of the following method steps, it is preferred that connecting sections 24 be made as thin as possible. If connecting sections 24 are formed only by first barrier layer 6 and second barrier layer 10, these form a kind of hinge joint in the area of connecting sections 24, and this joint connects two adjacent foam strips 26 in an articulated manner. A foam bridge between adjacent foam strips 26 also forms a hinge joint of this type. It must be taken into account, however, that, as the thickness of the foam bridge increases, it becomes more difficult to fold over sealing tape strips 22 in the area of connecting sections 24 comprising a foam bridge. If foam bridges are provided, these preferably comprise a maximum thickness of 10 mm, more preferably a maximum of 5 mm, and even more preferably a maximum of 1-2 mm. The foam bridges are especially well adapted to protecting first barrier layer 6 and second barrier layer 10 from damage when the at least one first cut 18 and the at least one second cut 20 are introduced.

Figure 3:
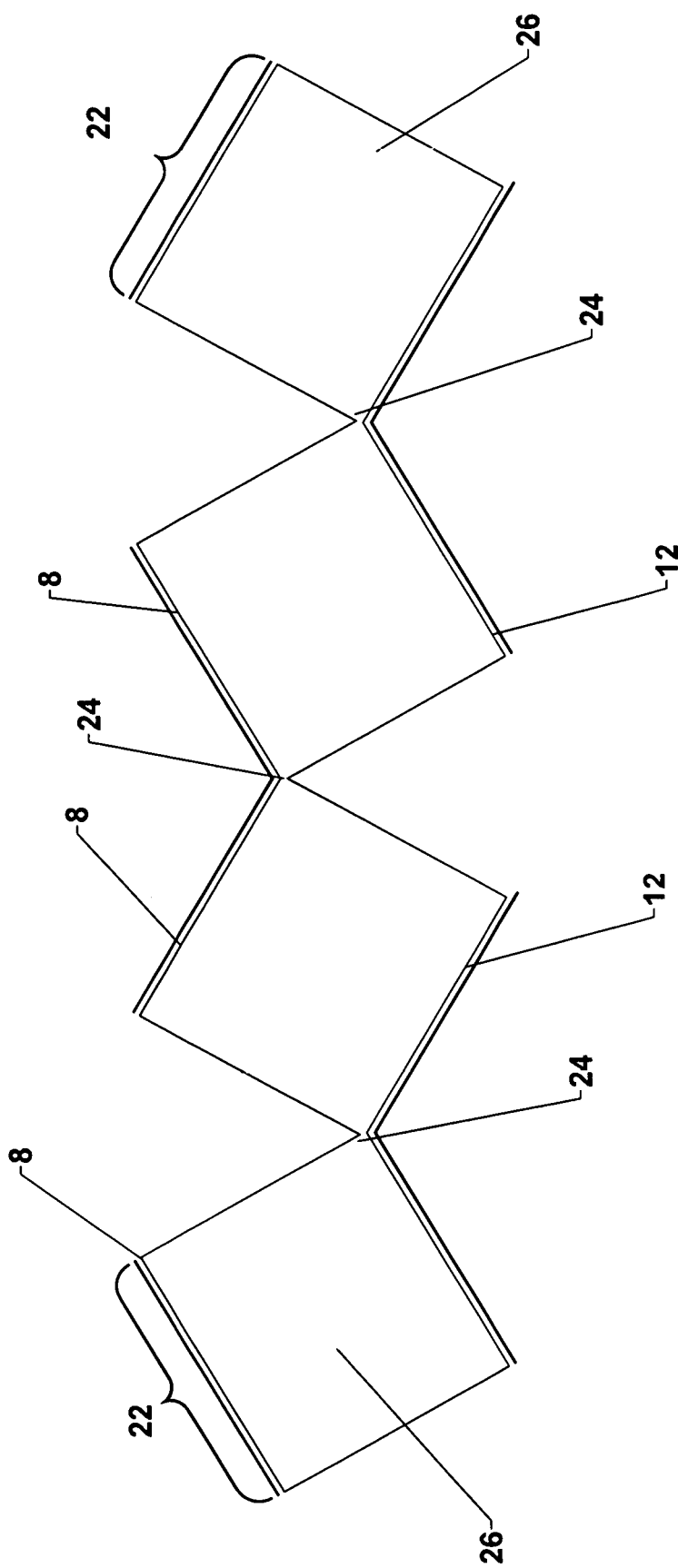
FIG. 3 shows a schematic cross-sectional view of the step of folding over the sealing tape strips of FIG. 2 produced during the cutting step.
Figure 4:
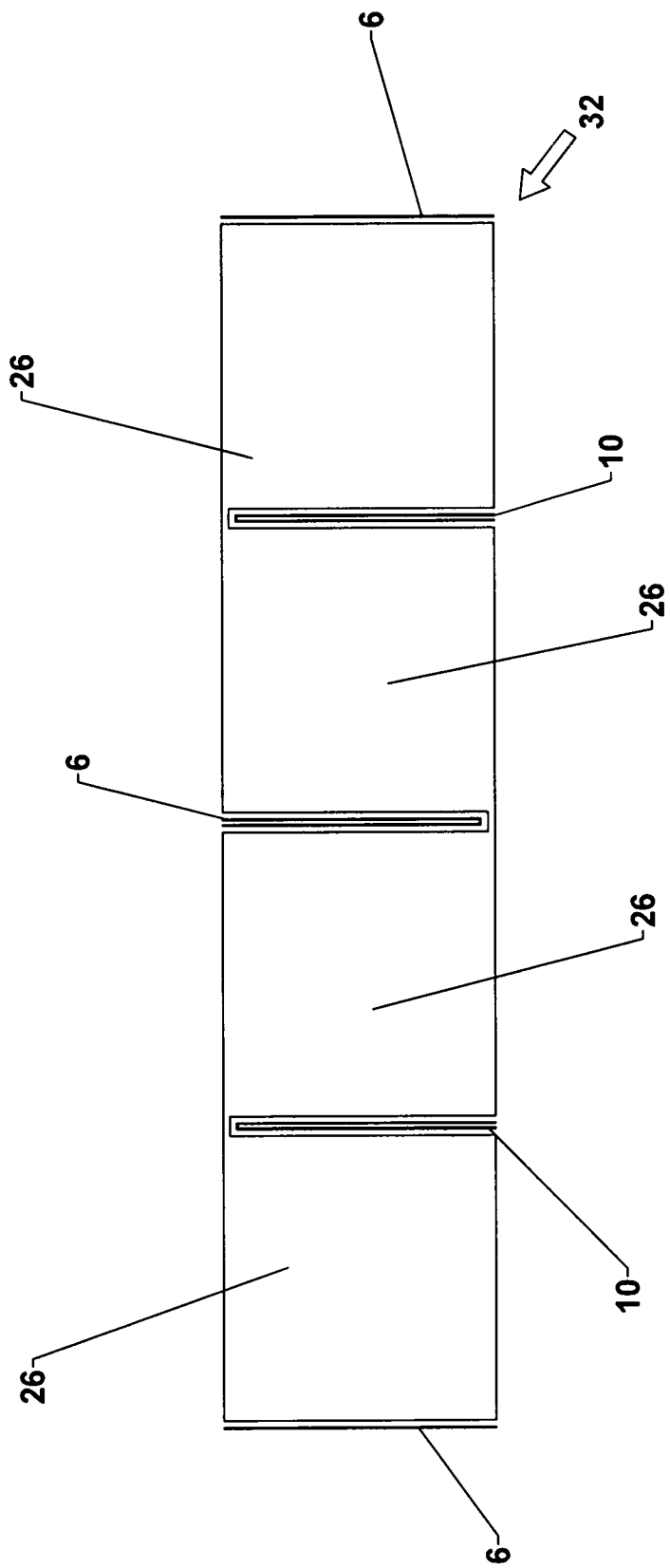
FIG. 4 shows a schematic cross-sectional view of a foam-barrier layer web produced by the folding-over step according to FIG. 3.

FIG. 3 shows the step of folding over sealing tape strips 22 in the area of connecting sections 24 to produce a foam-barrier layer web 32. A corresponding foam-barrier layer web 32 is illustrated in FIG. 4.

Sealing tape strips 22 which are separated from each other by a second cut 20 are connected to each other by a connecting section 24 in the area of first surface 8. These sealing tape strips 22 are folded over in the area of these connecting sections 24 in such a way that the subsections of first surface 8, each of which is adjacent to a common connecting section 24, are opposite each other. That is, the subsections of first barrier layer 6 of two adjacent sealing tape strips 22 with a common connecting section 24 in the area of first surface 8 come to rest flat against each other.

Sealing tape strips 22 which are separated from each other by a first cut 18 are connected to each other by a connecting section 24 in the area of second surface 12. These sealing tape sections 22 are again folded over in the area of these connecting sections 24 in such a way that the subsections of second surface 12, each of which is adjacent to a common connecting section 24, are opposite each other. That is, the subsections of second barrier layer 10 of two adjacent sealing tape strips 22 with a common connecting section 24 in the area of second surface 12 come to rest flat against each other. If second barrier layer 10 is not provided, the subsections of second surface 12 of two adjacent sealing tape strips 22 with a common connecting section 24 in the area of second surface 12 come to rest flat against each other.

The folding-over of sealing tape strips 22 in the area of connecting sections 24 is preferably carried out while foam web 4 or sealing tape strips 22 are being transported in conveying direction F. For this purpose, it is possible to open the at least one first cut 18 and the at least one second cut 20. For example, sealing tape strips 22 located on the outside in the transverse direction Q of the foam web 4 are gripped and then the foam web 4 is pulled apart in the transverse direction Q to open the cuts 18, 20. Alternatively, guides are introduced into the at least one first cut 18 and into the at least one second cut 20 and then spread the adjacent sealing tape strips 22 gradually apart. The complete folding-over process takes place in both cases by the use of suitable guides, which, for example, exert an appropriate pressure on the opposing surfaces of the sealing tape strips 22 and thus have the effect of folding over sealing tape strips 22.

FIG. 4 shows a schematic diagram of foam-barrier layer web 32. As can be seen, the inward-folded subsections of first barrier layer 6 now form barrier layers which are accommodated between two adjacent foam strips 26. If second barrier layer 10 is provided, then its inward-folded subsections also form barrier layers, each of which is accommodated between two adjacent foam strips 26. If second barrier layer 10 is not provided, then the subsections of second surface 12 now adjacent to each other rest directly against each other.

In FIG. 4, foam-barrier layer web 32 comprises a preferred, substantially flat shape. This is achieved in that the at least one first cut 18 and the at least one second cut 20 are introduced at uniform distances from each other in the transverse direction Q of foam web 4 in order to produce sealing tape strips 22 of equal width. As can be derived from a joint consideration of FIGS. 2-4, the width of sealing tape strips 22 in foam web 4 according to FIG. 2 is, after the folding-over step has formed foam-barrier layer web 32 according to FIG. 4, equal to the thickness of sealing tape strips 22. A uniform width of all sealing tape strips 22 of foam web 4 thus leads to a uniform thickness of sealing tape strips 22 of foam-barrier layer web 32.

It might also be desirable, however, for the at least one first cut 18 and the at least one second cut 20 to be introduced at unequal intervals from each other in the transverse direction Q of foam web 4. Sealing tape strips 22 of foam web 4 will then have different widths. This leads to the result that sealing tape strips 22 of foam-barrier layer web 32 will have different thicknesses, as a result of which a profiled foam-barrier layer web 32 is created. Areas of application are conceivable in which, in addition to interior barrier layers 6, 10, certain sections with increased compression in a sealing tape are desired, which can be achieved with a profiled foam-barrier layer web 32 of this type.

With respect to an advantageous shape of foam-barrier layer web 32, furthermore, it is preferred that, in cases where at least two first cuts 18 and/or at least two second cuts 20 are provided, a first cut 18 and a second cut 20 are introduced into foam web 22 in alternation in the transverse direction Q of foam web 4. As a result, sealing tape strips 22 come to rest next to each other after they have been folded over in the area of connecting sections 24 instead of becoming stacked on top of each other. This also contributes to the formation of a substantially flat foam-barrier layer web 32.

It is also preferred that the subsections of first or of second surface 8, 12 of opposing sealing tape strips 22 which have been provided with first barrier layer 6 or second barrier layer 10 be bonded to each other after the folding-over step. This can be done in particular by heating sealing tape strips 22 before the bonding, so that the material of first barrier layer 6 and, if present, of second barrier layer 10 are heated to a temperature above their melting points. Depending on the material of barrier layer 6, 10 in question being used, the same possibilities are available here as those already described above concerning the bonding of barrier layers 6, 10 to foam web 4.

The heating of the material of first barrier layer 6 and/or of second barrier layer 10 can be done especially easily and uniformly by heating the entire foam web 4 before sealing tape strips 22 are folded over. Sealing tape strips 22 are then bonded together as soon as they are folded over to form foam-barrier layer web 32. It is also possible, however, to fold over sealing tape strips 22 first and then to heat foam-barrier layer web 32. It can be sufficient to heat only edge areas of barrier layers, 6, 10, as long as a reliable bond can be guaranteed between sealing tape strips 22 and foam-barrier layer web 32.

Sealing tape strips 22 of foam-barrier layer web 32 are also preferably pressed against each other after they have been heated. A pressure is applied transversely to the foam-barrier layer web in a direction perpendicular to the subsections of first and second surfaces 8, 12 and perpendicular to the subsections of first and second barrier layers 6, 10. This pressure has the effect of pressing the sealing tape strips to be bonded against each other by their flat surfaces to achieve a reliable bond which is as complete as possible. Even slight pressures can be enough to accomplish this.

Alternatively, an additional bonding element such as an adhesive can be introduced between sealing tape strips 22; this can be done either in addition to the heating of sealing tape strips 22 or instead of the heating of sealing tape strips 22.

If the original foam web 4 has not been impregnated, the omission of the impregnation step can be rectified here. This is usually done by rolling in an immersion bath of an impregnating agent, squeezing out the excess impregnating agent, and drying with the use of heat. The impregnation can also be carried out at other points of the process.

As a result of the folding-over of sealing tape strips 22, the width of the structure to be further processed changes from the width of foam web 4 to the width of foam-barrier layer web 32. In a preferred embodiment, the at least one first cut 18 and the at least one second cut 20 are introduced into foam web 4 spaced apart in such a way that the width of foam-barrier layer web 32 is smaller than the width of foam web 4. It can therefore be desirable to arrange two foam-barrier layer webs 32 next to each other before the subsequent steps and, under certain conditions, to bond them together. It is especially preferable to obtain a bonded foam-barrier layer web 32 with a width which is equal to the width of foam web 4. In this way, the overall width of the structure to be further processed remains constant throughout the entire process. In the following, therefore, what is involved can always also be a foam-barrier layer web 32 assembled from several narrower foam-barrier layer webs 32.

Finally, at least one sealing tape roll 34 is formed from foam-barrier layer web 32. There are substantially three alternative methods available for doing this, which are described with reference to FIGS. 5a, 5b, and 5c.

Figure 5A:
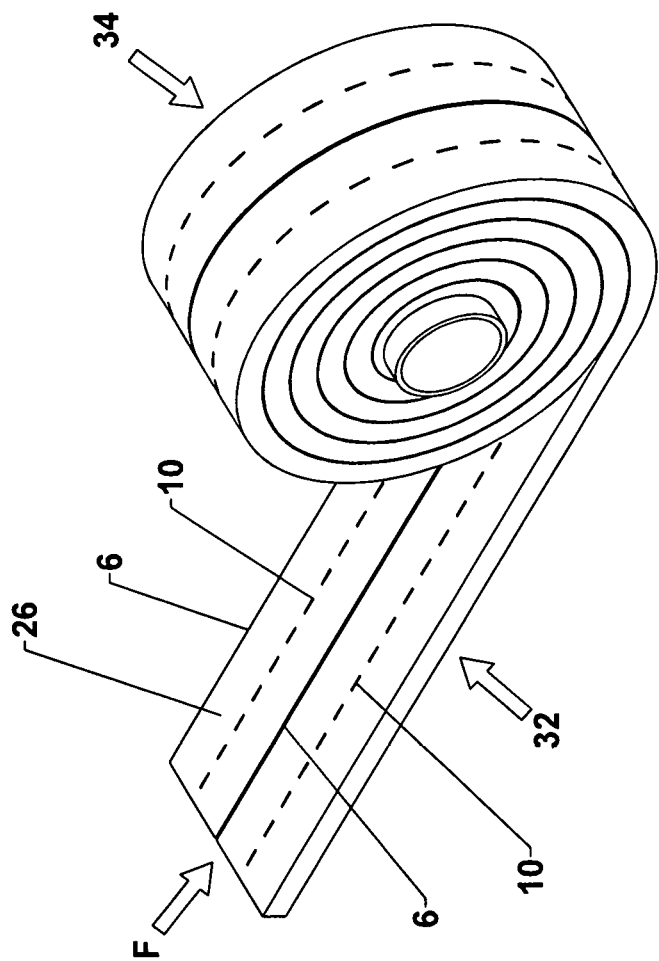
FIG. 5a shows a schematic cross-sectional view of the step of winding up the foam-barrier layer web of FIG. 4 into a sealing tape roll.

If foam-barrier layer web 32 already meets the requirements on the sealing tape to be produced, especially with respect to width and the number of interior barrier layers, foam-barrier layer web 32 transported in the conveying direction F can be wound up immediately into a sealing tape roll 34, as illustrated in FIG. 5a. The sealing tape roll 34 comprises at least one interior barrier layer formed from first barrier layer 6, which extends in the radial direction of sealing tape roll 34 and is accommodated axially between two foam strips 26. Several barrier layers are usually formed by first barrier layer 6, and in addition one or more barrier layers can also be formed by second barrier layer 10.

Figure 5B:
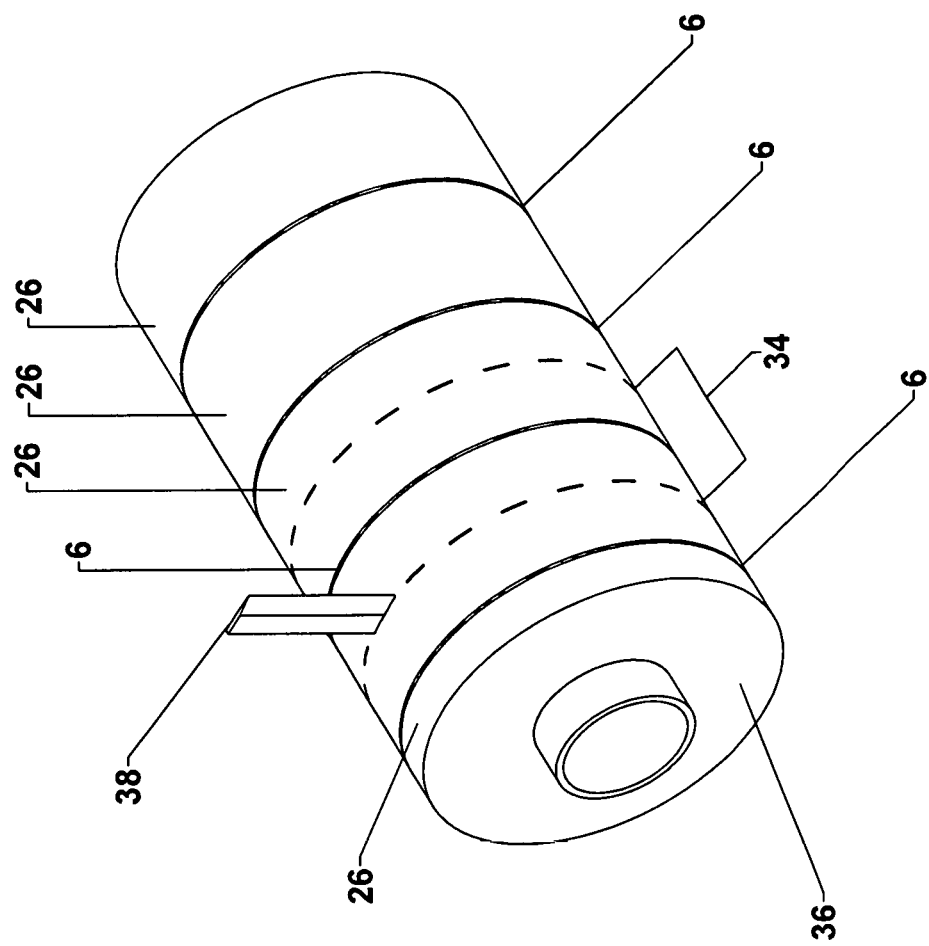
FIG. 5b shows a schematic cross-sectional view of the step of cutting an intermediate roll formed from the foam-barrier layer web of FIG. 4 all the way through to produce a plurality of sealing tape rolls in an alternative embodiment of the method according to the invention.

If foam-barrier layer web 32 is wider than the sealing tape to be produced and/or comprises more interior barrier layers than sealing tape roll 34 to be produced is supposed to have, foam-barrier layer web 32 can be wound up first to form an intermediate roll 36. As shown in FIG. 5b, intermediate roll 36 can be cut through at one or more points in the axial direction to produce a plurality of sealing tape rolls 34, which are less wide than the intermediate roll 36. Intermediate roll 36 is preferably cut through by one or more parallel saws 38. Only one saw 38 is shown in FIG. 5b, and another parallel cut for cutting all the way through intermediate roll 36 is indicated in dashed line. The at least one cut for cutting through intermediate roll 36 is preferably introduced into a foam strip 26 in such a way as not to damage the interior barrier layers. Here, too, other suitable methods for cutting through the roll can also be used (e.g., knives, heated wires, laser cutters, water-jet cutters).

Intermediate roll 36 is cut into sealing tape rolls 34 in such a way that foam strips 26 and the at least one first barrier layer 6 alternate in the axial direction of sealing tape roll 34. Every radially oriented first barrier layer 6 in a sealing tape roll 34 is accommodated between two foam strips 26, as a result of which a sealing tape has increased sealing effectiveness against drafts and/or vapor diffusion, and each barrier layer 6 is protected from external damage at the same time. If the at least one first cut 18 and/or the at least one second cut 20 is introduced into foam web 4 in such a way that it does not pass all the way through the web, the remaining foam bridges cover the sections of first or second barrier layer 6, 10 lodged between sealing tape strips 22, so that, depending on the direction of the winding, only one of the barrier layers or neither of barrier layers 6, 10 is visible from the outside in the rolled-up state of the sealing tape roll 34 or of intermediate roll 36.

Figure 5C:
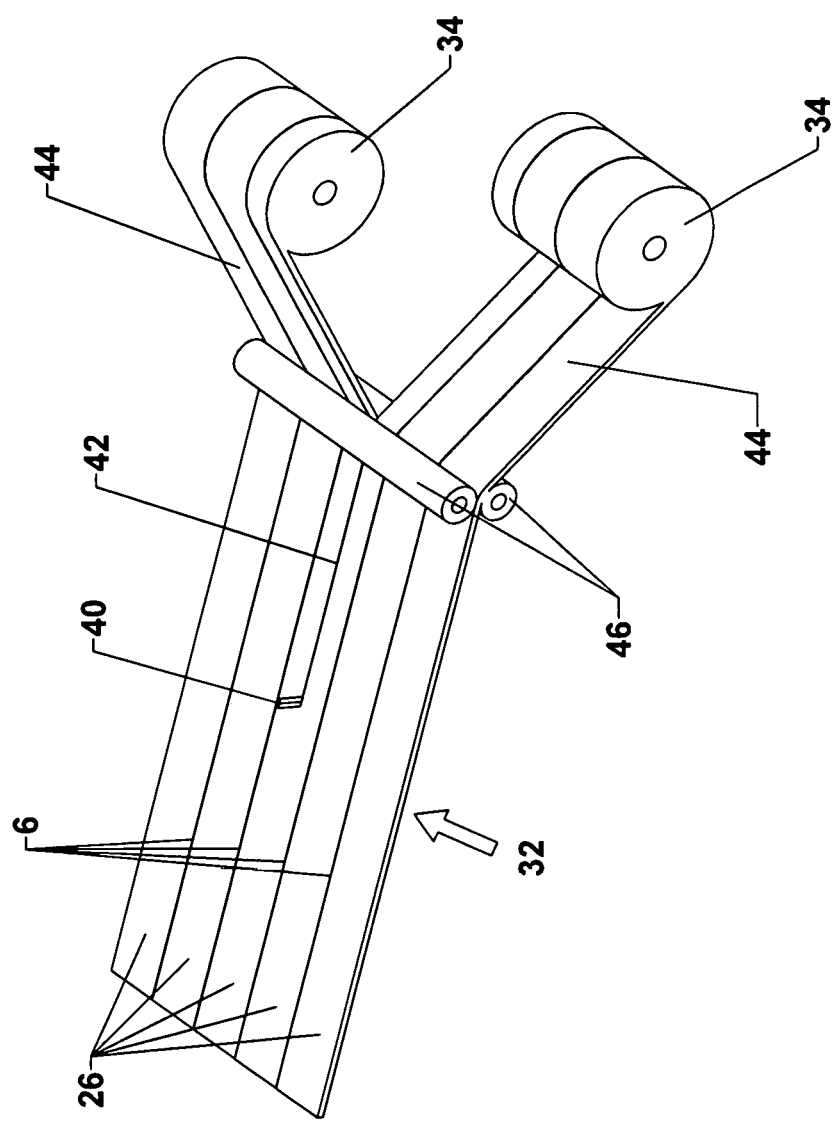
FIG. 5c shows a schematic cross-sectional view of the step of introducing a cut into the foam-barrier layer web of FIG. 4 and the step of winding up foam-barrier layer strips into individual sealing tape rolls in another alternative embodiment of the method according to the invention.

FIG. 5c shows another possibility of the final processing of the foam-barrier layer web 32 for the production of sealing tape rolls 34. In this variant, foam-barrier layer web 32 is cut all the way through in the longitudinal direction by one or more knives 40 or saws in the area of at least one foam strip 26. As a result, at least one cut 42 is made in foam-barrier layer web 32, as a result of which at least two foam-barrier layer strips 44 are produced. Each of foam-barrier layer strips 44 can then be wound up into a finished sealing tape roll 34. In this way, the step of dividing an intermediate roll 36 shown in FIG. 5b can be omitted.

In all of the embodiments, foam-barrier layer webs 32 or foam-barrier layer strips 44 are compressed before they are wound up into sealing tape rolls 34. This can be done either by either upstream compression rollers or by the pressure on foam-barrier layer web 32 or of foam-barrier layer strips 44 exerted during the winding-up step. Compression rollers 46 for this purpose are shown by way of example in FIG. 5c.

In all three exemplary embodiments according to FIGS. 5a-5c, an adhesive layer can be applied to foam-barrier layer web 32, i.e., to a surface of foam-barrier layer web 32 extending transversely to barrier layers 6, 10. In the exemplary embodiment according to FIG. 5c, it is also possible to form foam-barrier layer strips 44 first and then to apply the adhesive layer to them. The adhesive layer is preferably configured as double-sided adhesive tape lined on one side with a peel-off film. The adhesive tape is for its own part stored on a spool or roll, from which it is pulled. The adhesive tape is preferably applied to foam-barrier layer web 32 simultaneously with the winding-up of foam-barrier layer web 32 into intermediate roll 36 or into sealing tape roll 34, wherein compression rollers 46 produce the pressure for bonding the adhesive tape to foam-barrier layer web 38 or to foam-barrier layer strips 44.

In the following, an alternative exemplary embodiment of a method according to the invention will be described with reference to FIGS. 6-9. In this example as well, a foam web 4 is provided first, and a first barrier layer 6 is applied to a first surface 8 of the foam web 4. In this regard, reference can be made to the description of FIG. 1a. In this exemplary embodiment, it is preferred that only first barrier layer 6 be provided. If desired, however, a second barrier layer 10 can also be provided as explained above and applied to second surface 12 of the foam web.

Figure 6:
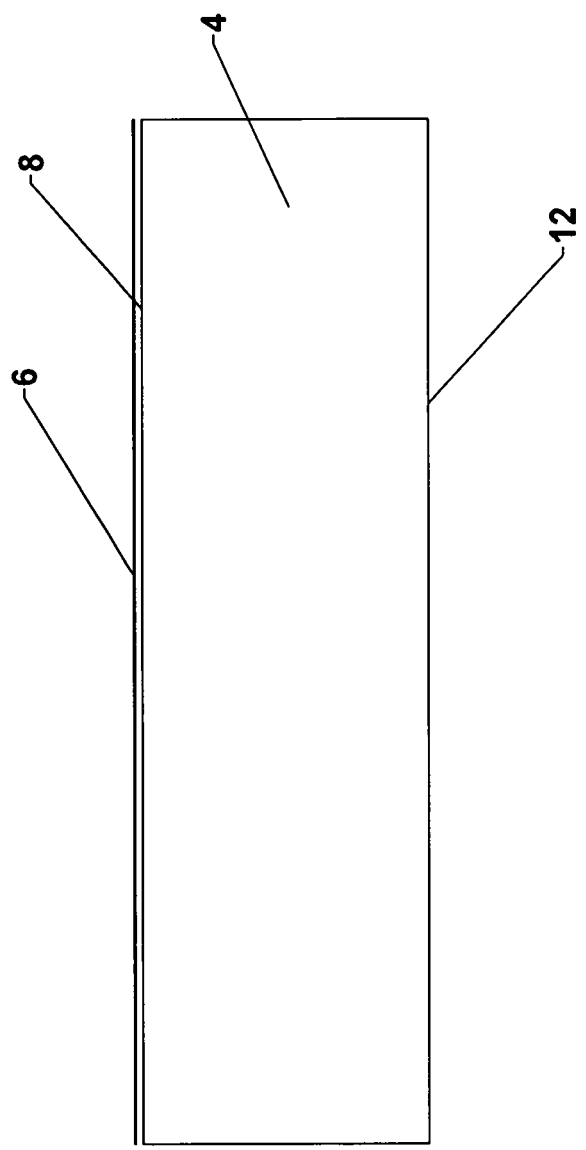
FIG. 6 shows a schematic cross-sectional view of a foam web with a first barrier layer as a basis for an alternative embodiment of the method according to the invention.

FIG. 6 shows a schematic, cross-sectional view of foam web 4 after the application of first barrier layer 6 to first surface 8. First surface 8 preferably corresponds to the top surface of foam web 4, and second surface 12 preferably corresponds to the bottom surface of foam web 4.

Figure 7:
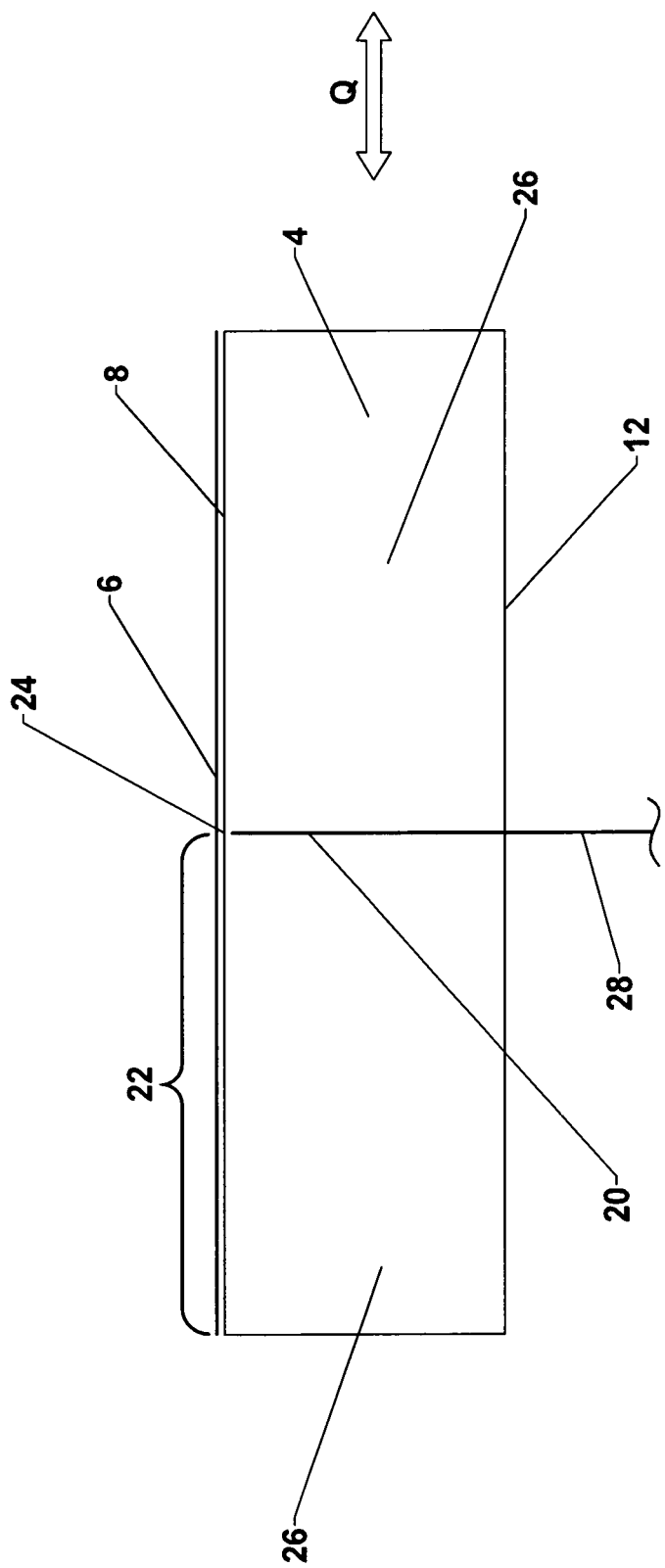
FIG. 7 shows a schematic cross-sectional view of the step of introducing a cut into the foam web of FIG. 6.

In FIG. 7 it can be seen how cut 20 is introduced into second surface 12 of foam web 4 and extends in the longitudinal direction with foam web 4, which direction is perpendicular to the plane of the drawing. The longitudinal direction is parallel to conveying direction F. A transverse direction of foam web 4 is indicated in FIG. 7 by the arrow Q.

As a result of the introduction of cut 20 (which also passes all the way through second barrier layer 10, if present), two parallel sealing tape strips 22 are formed, wherein a connecting section 24 remains between adjacent sealing tape strips 22. Each sealing tape strip 22 is formed by a foam strip 26 and by at least the subsections of first barrier layer 6 applied to it.

Cut 20 is preferably introduced by a knife 28 into foam web 4 in the longitudinal direction of the web and preferably parallel to the longitudinal edges 30 of foam web 4. Longitudinal edges 30 are the edges of foam web 4 which are parallel to conveying direction F and orthogonal to the axial direction of output roll 2, see FIG. 1a. To introduce cut 20 into foam web 4, it is possible to use not only knife 28 but also any of the other methods for cutting foam webs 4 familiar to the skilled person such as saws, laser cutters, or water-jet cutters.

Cut 20 can either pass all the way through foam web 4 or not pass all the way through foam web 4; in the latter case, a foam bridge remains behind between the two adjacent foam strips 26.

Regardless of whether a second barrier layer 10 is provided or not, cut 20 can pass all the way through foam web 4 or not pass completely through it. If cut 20 passes all the way through foam web 4, the at least one connecting section 24 in the area of first surface 8 is formed by first barrier layer 6 alone. If cut 20 does not pass all the way through foam web 4, the at least one connecting section 24 in the area of first surface 8 comprises a foam bridge and first barrier layer 6.

With a view to the subsequent method steps, it is preferable for connecting section 24 to be as thin as possible. If connecting section 24 is formed only by first barrier layer 6, this layer forms a kind of hinge joint in the area of connecting section 24, which connects the two adjacent foam strips 26 together in an articulated manner. A foam bridge between adjacent foam strips 26 also forms a hinge joint of this type. It must be taken into consideration, however, that, as the thickness of the foam bridge increases, the more difficult it becomes to fold over sealing tape strips 22 afterwards in the area of a connecting section 24 comprising a foam bridge. If a foam bridge is provided, this preferably comprises a thickness of no more than 10 mm, more preferably of no more than 5 mm, and even more preferably of no more than 2 mm. The foam bridge is especially well adapted to protecting first barrier layer 6 from damage as first cut 20 is being introduced.

Figure 8:
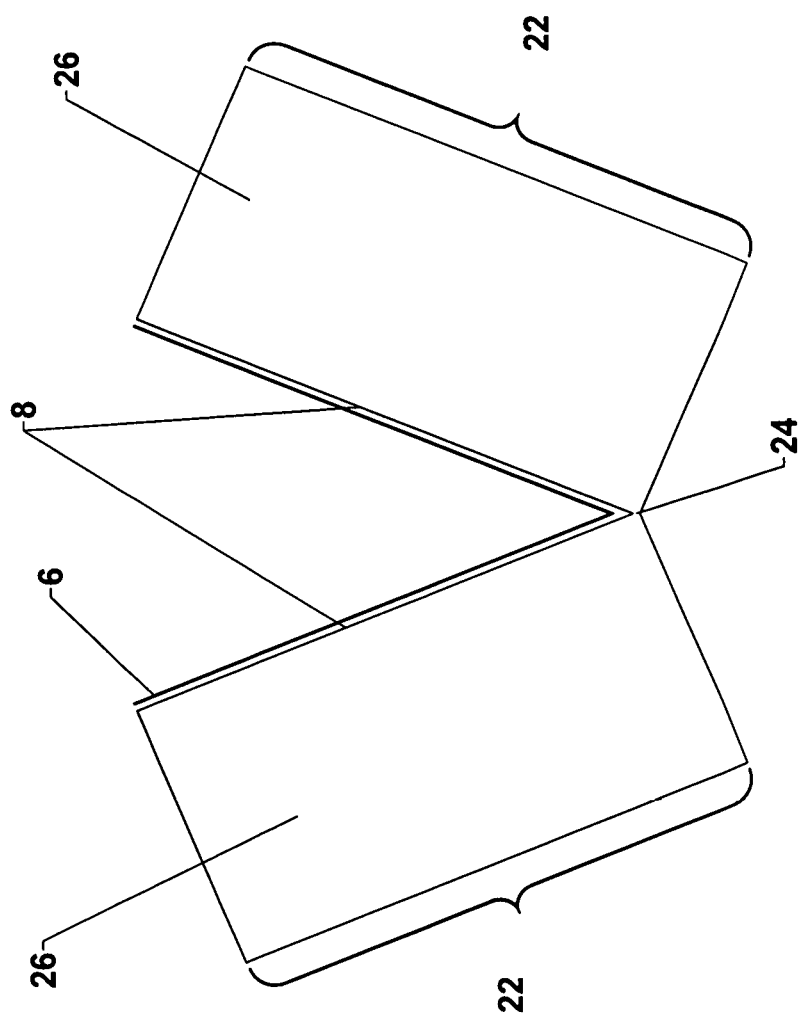
FIG. 8 shows a schematic cross-sectional view of the step of folding over the sealing tape strips of FIG. 7 produced during the cutting step.

FIG. 8 shows the step of folding over sealing tapes 22 in the area of connecting section 24 to produce a foam-barrier layer web 32. A corresponding foam-barrier layer web 32 is illustrated in FIG. 9.

Sealing tape strips 22 which have been separated from each other by cut 20 are connected to each other in the area of first surface 8 by connecting section 24. Sealing tape sections 22 are folded over in the area of this connecting section 24 in such a way that the subsections of first surface 8 which are adjacent to the common connecting section 24 are opposite each other. That is, the subsections of first barrier layer 6 of adjacent sealing tape strips 22 come to rest flat against each other in the area of first surface 8.

The folding-over of sealing tape strips 22 in the area of connecting sections 24 is preferably carried out while foam web 4, i.e., sealing tape strips 22, are being transported in conveying direction F. Methods and devices can also be provided to open cut 20. For example, sealing tape strips 22 are gripped and then foam web 4 is pulled apart in transverse direction Q to open cut 20. Alternatively, guides are introduced into cut 20 and spread sealing tape strips 22 gradually apart. The complete folding-over is accomplished in both cases by appropriate guides, which, for example, exert an appropriate pressure on the opposing surfaces of sealing tape strips 22 and thus have the effect of folding sealing tape strips 22 over.

Figure 9:
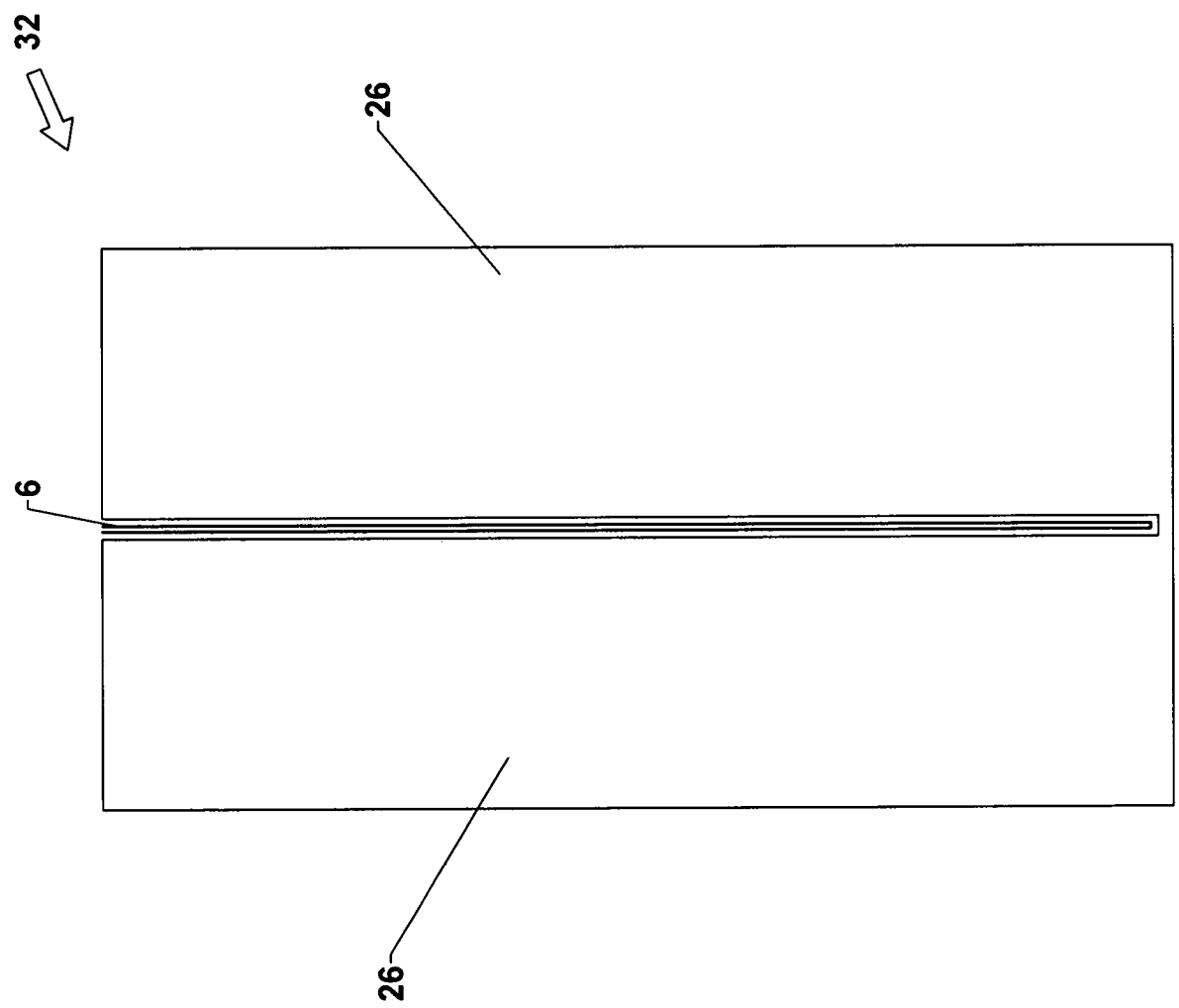
FIG. 9 shows a schematic cross-sectional view of a foam-barrier layer web produced by the folding-over step according to FIG. 8.

FIG. 9 shows a schematic diagram of a foam-barrier layer web 32. As can be seen, the inward-folded subsections of the first barrier layer 6 now form a barrier layer which is accommodated between two adjacent foam strips 26.

In FIG. 9, foam-barrier layer web 32 comprises a preferred, substantially flat shape. This is achieved in that, with respect to transverse direction Q, cut 20 is introduced into the middle of foam web 4. It is therefore the same distance away from the left side surface of foam web 4 as it is from the right side surface, as a result of which sealing tape strips 22 of equal width are produced. As can be derived from a combined consideration of FIGS. 7-9, the width of sealing tape strips 22 in foam web 4 according to FIG. 7 is, after the folding-over to form foam-barrier layer web 32 according to FIG. 9, equal to the thickness of sealing tape strips 22. A uniform width of sealing tape strips 22 of foam web 4 thus leads to a uniform thickness of sealing tape strips 22 of foam-barrier layer web 32.

It can also be desirable, however, for cut 20, when seen in the transverse direction Q of foam web 4, to be off-center, i.e., at unequal distances from the left and right side surfaces of foam web 4. Sealing tape strips 22 of foam web 4 then comprise different widths. This has the result that sealing tape strips 22 of foam-barrier layer web 32 have different thicknesses, as a result of which a profiled foam-barrier layer web 32 is obtained. Areas of application are conceivable in which, in addition to interior barrier layer 6, certain areas of increased compression in a sealing tape are desired, which can then be achieved with a foam-barrier layer web 32 which has been profiled in this way.

It is also preferable for the opposing subsections of first surface 8 of sealing tape strips 22 provided with the first barrier layer 6 to be bonded to each other after the folding-over step. This can be done in particular by heating sealing tape strips 22 before the bonding, so that the material of first barrier layer 6 is heated to a temperature above its melting point. Depending on the material used for barrier layer 6, the same possibilities are available here as those described above for bonding barrier layers 6, 10 to foam web 4.

The heating of the material of first barrier layer 6 can be achieved very easily and uniformly by heating the entire foam web 4 before the sealing tape strips 22 are folded over. Sealing tape strips 22 are then bonded together as soon as they are folded over to form foam-barrier layer web 32. It is also possible, however, to heat foam-barrier layer web 32 after sealing tape strips 22 have been folded over. It can be sufficient to heat only edge areas of barrier layer 6, as long as this ensures a reliable bond between sealing tape strips 22 and foam-barrier layer web 32.

Sealing tape strips 22 of foam-barrier layer web 32, furthermore, are preferably pressed together after they have been heated. Pressure is applied in the transverse direction to foam-barrier layer web 32 in a direction perpendicular to the subsections of first surface 8 or perpendicular to the subsections of first barrier layer 6. As a result of the pressure, sealing tape strips 22 to be bonded together are pressed flat against each other to achieve a reliable bond which is as complete as possible. Even slight pressures can be sufficient for this.

Alternatively, in addition to the heating of sealing tape strips 22 or instead of the heating of sealing tape strips 22, an additional bonding alternative such as an adhesive can be introduced between sealing tape strips 22.

If the original foam web 4 was not already impregnated, the step of impregnating it can be carried out now. This is usually done by rolling in an immersion bath of an impregnating agent, squeezing out the excess impregnating agent, and drying with the input of heat. The impregnation step can also be carried out at other points of the process.

As a result of the folding-over of sealing tape strips 22, the width of the structure to be subjected to further processing changes from the width of foam web 4 to the width of foam-barrier layer web 32. In a preferred embodiment, the width of foam-barrier layer web 32 is smaller than the width of foam web 4. It can therefore be desirable, before the subsequent steps, to arrange at least two foam-barrier layer webs 32 next to each other and, under certain circumstances, to bond them together. The bringing-together of several foam-barrier layer webs 32 is done before foam-barrier layer web 32 is wound up into a roll. In the following, therefore, foam-barrier layer web 32 under discussion can therefore always be a wider web formed out of several narrower foam-barrier layer webs 32.

Finally, at least one sealing tape roll 34 is formed from foam-barrier layer web 32. According to the embodiment of the method in which a plurality of foam-barrier layer webs 32 is brought together to form a wider foam-barrier layer web 32, foam-barrier layer web 32 is wound up directly into a roll, which corresponds to sealing tape roll 34. Sealing tape roll 34 comprises an interior barrier layer formed by first barrier layer 6, which extends in the radial direction of sealing tape roll 34 and is accommodated axially between two foam strips 26.

In alternative embodiments, in which multiple foam-barrier layer webs 32 are joined together to form a wide foam-barrier layer web 32, sealing tapes can be obtained from foam-barrier layer web 32 in the same way as that described above in connection with FIGS. 5a and 5c. The roll then corresponds either to a sealing tape roll 34 with a plurality of interior barrier layers (FIG. 5a) or to an intermediate roll 36 (FIG. 5b). A cut 42 can also be introduced into the wide foam-barrier layer web 32 to divide it into at least two foam-barrier layer strips 44 according to FIG. 5c, and foam-barrier layer strips 44 can then be wound up into sealing tape rolls 34. For the other details, reference is made to the discussion of FIGS. 5a-5c.

Figure 10:
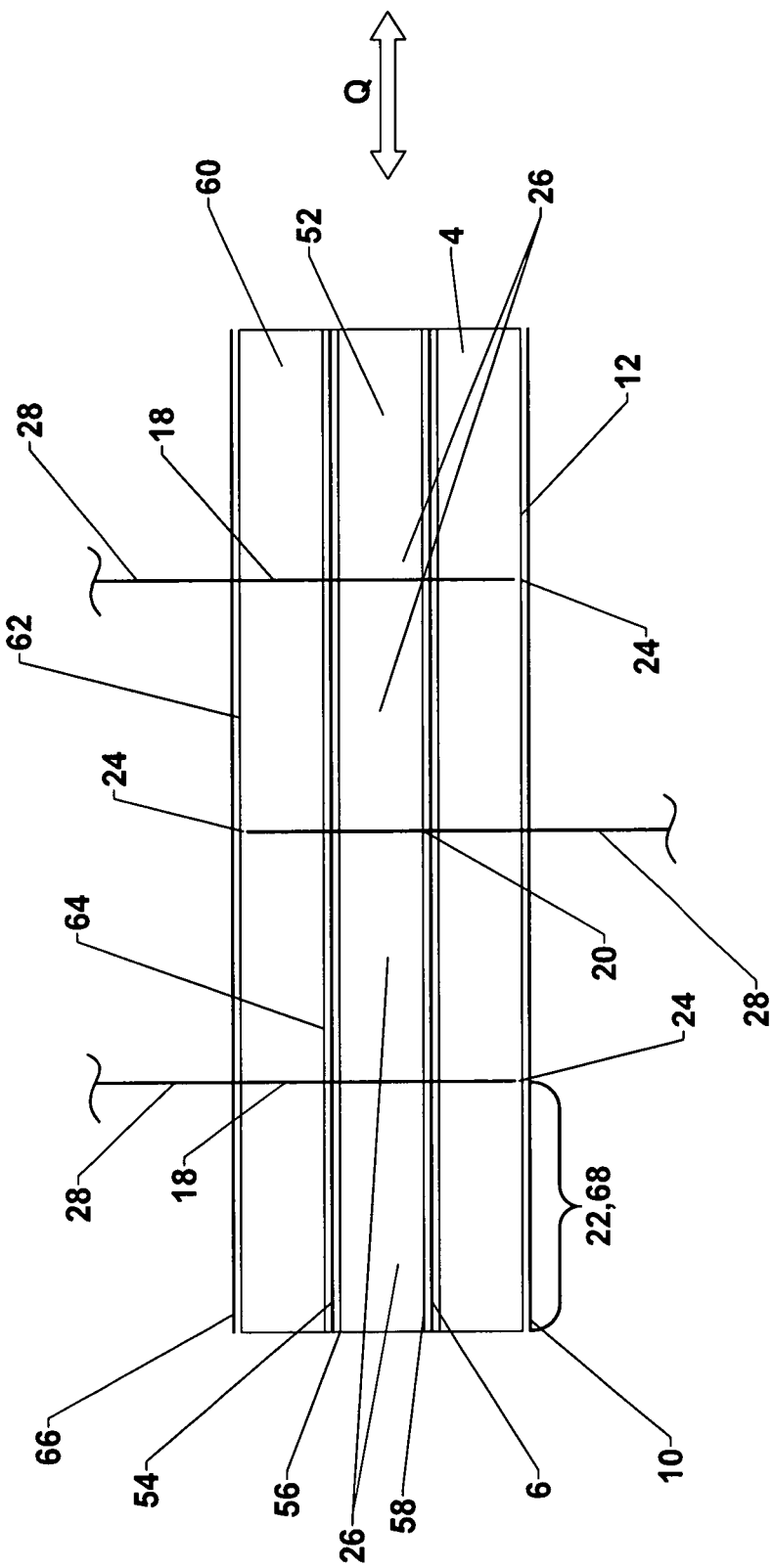
FIG. 10 shows a schematic cross-sectional view of the step of introducing first and second cuts into a plurality of stacked foam webs according to another alternative embodiment of the method according to the invention.
Figure 11:
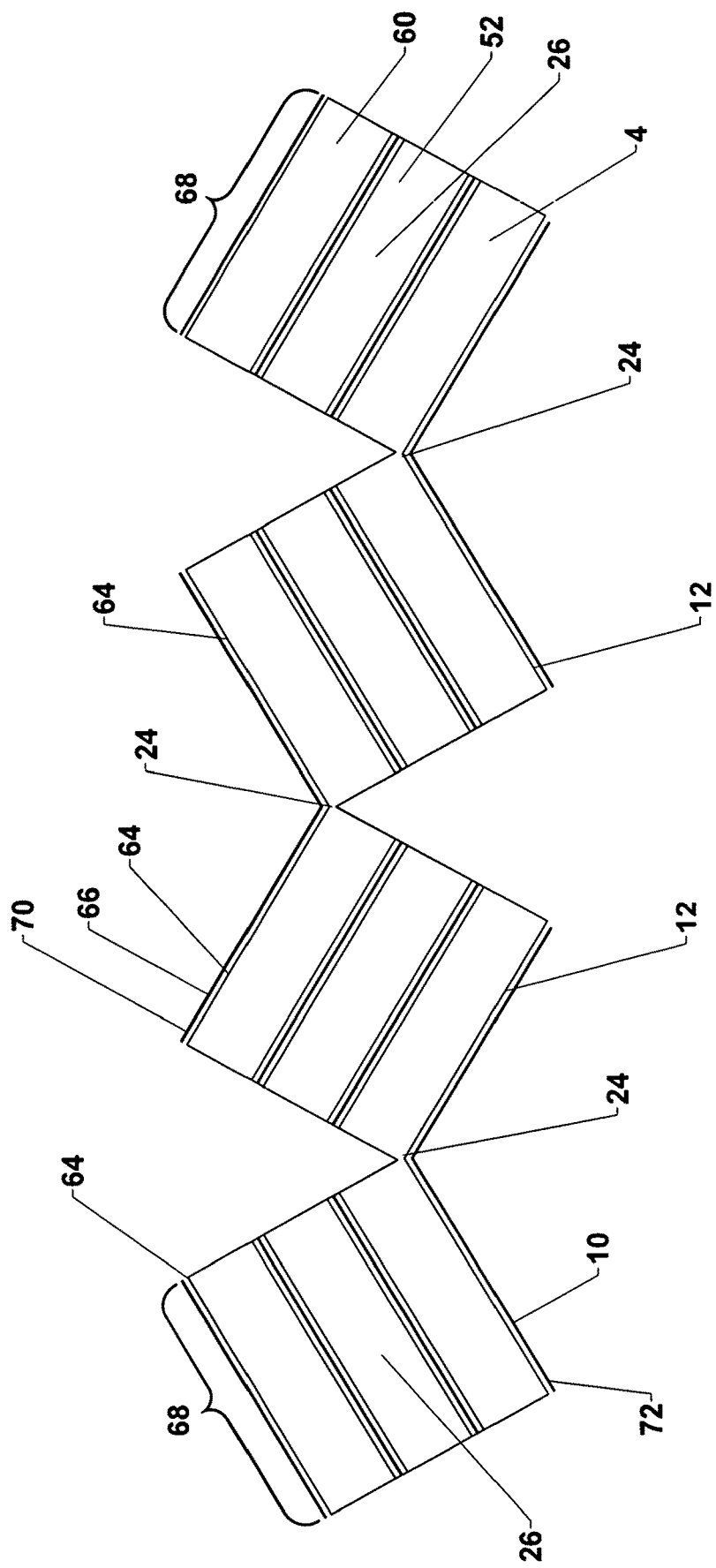
FIG. 11 shows a schematic cross-sectional view of the step of folding over the sealing tape sections of FIG. 10 produced by the cutting step.
Figure 12:
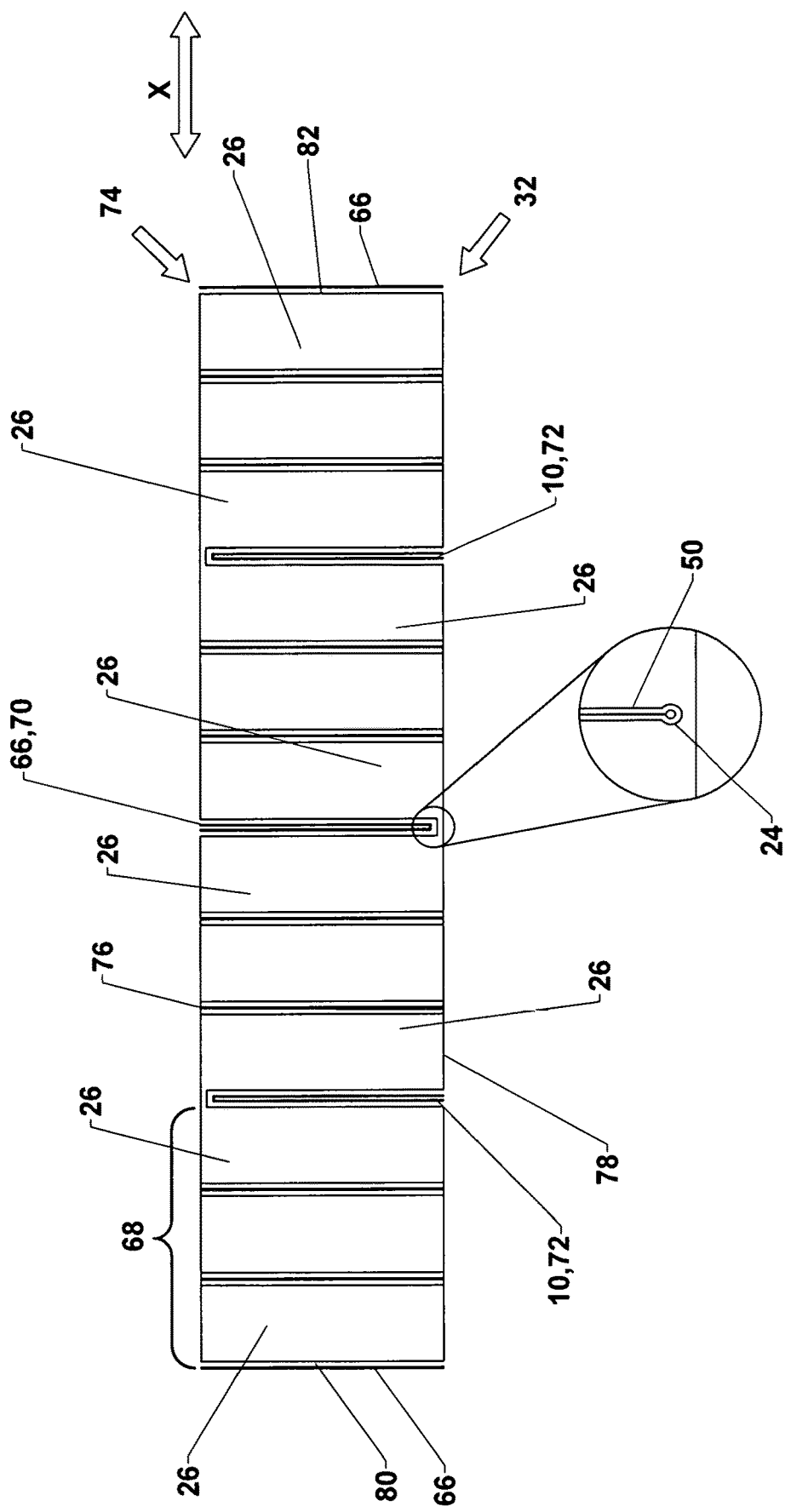
FIG. 12 shows a schematic cross-sectional view of a foam-barrier layer web produced by the folding-over step according to FIG. 11 with a detailed view of a connecting section.

Another alternative exemplary embodiment of the method according to the invention is described on the basis of FIGS. 10-12.

As can be seen in FIG. 10, the first step in this embodiment as well is to provide foam web 4, which corresponds to a first foam web 4, and to apply first barrier layer 6 to first surface 8. Second barrier layer 10 is also preferably applied to second surface 12 of first foam web 4. Next, the step of applying a second foam web 52 to first barrier layer 6 is carried out. A third barrier layer 54 is preferably applied to a first surface 56 of second foam web 52. First surface 56 of second foam web 52 corresponds in this example to a top surface of second foam web 52, whereas a second surface 58 of second foam web 52 corresponds to a bottom surface of that web. Second surface 58 of second foam web 52 lies flat against first barrier layer 6.

A third foam web 60, furthermore, can be applied to third barrier layer 54. Third foam web 60 comprises a first surface 62 and a second surface 64, wherein first surface 62 corresponds to a top surface and second surface 64 to a bottom surface of third foam web 60. Second surface 64 of third foam web 60 lies flat against third barrier layer 54. Finally, it is preferable to apply a fourth barrier layer 66 to first surface 62 of third foam web 60. Each barrier layer 6, 10, 54, 66 is bonded to the adjacent foam web or adjacent foam webs 4, 52, 60. In regard to the materials of the barrier layers and to the bonding of a barrier layer to a foam web, reference can be made to the discussion of first barrier layer 6 and to the bonding of that barrier layer to foam web 4.

The application of additional foam webs and barrier layers can be repeated as often as desired to produce a multilayer foam web-barrier layer stack. After the multilayer foam web-barrier layer stack of the desired thickness has been produced, the method is continued according to FIG. 10.

FIG. 10 shows the step of introducing at least one first cut 18 and at least one second cut 20 into the multilayer foam web-barrier layer stack. The at least one first cut 18 is introduced here as well into the first surface of first foam web 4, and the at least one second cut 20 is, in this case as well, introduced into second surface 12 of first foam web 4. More precisely, the at least one first cut 18 is introduced from the first surface of the uppermost foam web—here first surface 62 of third foam web 60—into the foam web-barrier layer stack. Second cut 20 is introduced starting from the second surface of the lowermost foam web, here second surface 12 of first foam web 4, into the foam web-barrier layer stack. As a result of the introduction of the at least one first cut 18 and of the at least one second cut 20 in the longitudinal direction of foam webs 4, 52, 60, parallel sealing tape sections 68 are formed. A connecting section 24 remains behind between two adjacent sealing tape sections 68.

It can be seen that the introduction of the at least one first cut 18 and the introduction of the at least one second cut 20 are carried out in the same way, as was described in connection with FIG. 2 pertaining to the first exemplary embodiment.

Sealing tape sections 68 in this exemplary embodiment are formed out of several sealing tape strips 22 arranged on top of each other. Each sealing tape section 68 therefore consists of a plurality of foam strips 4, 52, 60 and a plurality of barrier layers 6, 10, 54, 66. Sealing tape sections 68 adjacent to a first cut 18 are joined together by a connecting section 24 in the area of the second surface of the lowermost foam web, here second surface 12 of first foam web 4. Sealing tape sections 68 adjacent to a second cut 20 are joined together by a connecting section 24 in the area of the first surface of the uppermost foam web, here first surface 62 of third foam web 60. Each connecting section 24 can comprise a foam bridge or be formed only by barrier layer 6, 66 arranged in connecting section 24 in question.

FIG. 11 illustrates the step of folding over sealing tape sections 68 produced by the cutting operation. The folding-over of sealing tape sections 68 is carried out in the area of connecting sections 24 to produce a foam-barrier layer web like that shown in FIG. 12. This means that, here, too, sealing tape strips 22 out of which each sealing tape section is formed are folded over in the area of connecting sections 24.

Sealing tape sections 68 are folded over in such a way that subsections of first surface 8 of the lowermost foam web 4, which are each adjacent to a common connecting section 24, are opposite each other, and subsections of second surface 64 of uppermost foam web 60, which are each adjacent to a common connecting section 24, are opposite each other. For the rest, what was said concerning FIG. 3 also applies here, except that, in place of one sealing tape strip 22, a multilayer sealing tape section 68 is present.

The two subsections of the barrier layer adjacent to a common connecting section 24 in the area of the first surface of the uppermost foam web, here first surface 62 of third foam web 60, form in each case a first barrier layer section 70, which, after the sealing tape sections 68 have been folded over, is accommodated between two sealing tape sections 68. The two subsections of the barrier layer adjacent to a common connecting section 24 in the area of the second surface of the lowermost foam web, here second surface 12 of first foam web 4, form in each case a second barrier layer section 72, which, after sealing tape sections 68 have been folded over, are accommodated between two sealing tape sections 68.

It can be seen that, in the embodiment according to FIGS. 10-12, the at least one first barrier layer section 70 is part of the first barrier layer 6, and the at least one second barrier layer section 72 is part of the second barrier layer 10.

FIG. 12 shows a foam-barrier layer web 32 produced by the folding-over step according to FIG. 11, which consists of a plurality of sealing tape sections 68 arranged next to each other. As can be seen, the at least one first barrier layer section 70 and the at least one second barrier layer section 72 now form barrier layers which are accommodated between two adjacent sealing tape sections 68. In addition, each sealing tape section also contains two additional barrier layers, which consist of the folded-over subsections of first and third barrier layers 6, 54. It is preferable for sealing tape sections 68 to be bonded together after they have been folded over in the same way as sealing tape strips 22 of the embodiment according to FIG. 4. Sealing tape sections 68 are also heated, preferably before the folding-over step, but also, alternatively, they can be heated after the folding-over.

In analogy to FIGS. 5*a*-5*c*, at least one sealing tape roll can be formed from foam-barrier layer web 32 according to FIG. 12. For this purpose, foam-barrier layer web 32 can be either wound up immediately into a sealing tape roll 34; wound up into an intermediate roll 36, which is cut through at several points in the axial direction to form a plurality of sealing tape rolls 34; or, by the introduction of at least one cut 42 into foam-barrier layer web 32, separated into a plurality of foam-barrier layer strips 44, which are then wound up into individual sealing tape rolls 34. The details on the production of sealing tape rolls from foam-barrier layer web 32 can be found in the description of FIGS. 5*a*-5*c*.

Finally, a sealing element produced according to the invention will be described with reference to FIGS. 4 and 12. The sealing element can be a sealing tape to be rolled up into a sealing tape roll 34 consisting of flexible, compressible foam with at least one barrier layer extending in the radial direction. The sealing element, however, can also be foam-barrier layer web 32, from which a sealing tape roll is formed over the further course of processing.

Sealing element 74 of flexible foam has a top surface 76, a bottom surface 78, and two side surfaces 80, 82, which connect the top surface 76 to the bottom surface 78. The sealing element 74 also comprises at least three sealing tape sections 68. Sealing tape sections 68 each comprise one or more sealing tape strips 22.

The sealing tape sections are arranged next to each other in a functional direction of sealing element 74. The "functional direction" is parallel to the top and bottom surfaces 76, 78 and perpendicular to the side surfaces 80, 82 and is indicated in FIG. 12 by the arrow X.

At least one first barrier layer section 70 and at least one second barrier layer section 72 are each accommodated between two adjacent sealing tape sections 68. The at least one first barrier layer section 70 and the at least one second barrier layer section 72 bond sealing tape sections 68 in question together and are parallel to side surfaces 80, 82 of sealing element 74. If sealing tape sections 68 each comprise several sealing tape strips 22, additional barrier layer sections 6, 54, which are parallel to side surfaces 80, 82, are then accommodated in each sealing tape section.

In an installed state in which sealing element 74 is accommodated in a joint between a frame element and a masonry wall, top surface 76 and bottom surface 78 rest against the opposing surfaces forming the joint, i.e., between a surface of the frame element and a surface of the masonry wall. Barrier layer sections 70, 72 extend transversely through the joint from the frame element to the masonry wall. This is illustrated by the fact that functional direction X is perpendicular to the planes of first barrier layer section 70 and of second barrier layer section 72.

The at least one first barrier layer section 70 and the at least one second barrier layer section 72 each form a loop 50 between adjacent sealing tape sections 68. According to the invention, at least one first barrier layer section 70 forms the loop 50 in the area of bottom surface 78 of sealing element 74, and at least one second barrier layer section 72 forms loop 50 in the area of top surface 76 of sealing element 74. If sealing element 74 comprises several first barrier layer sections 70 and/or several second barrier layer sections 72, then, when seen in functional direction X, a first barrier layer section 70 and a second barrier layer section 72 always occur in alternation. The reason for this is that, as is preferred, at least one first cut 18 and at least one second cut 20 are also introduced in transverse direction Q of foam web 4 in alternation with each other.

Loop 50 is formed by the folding-over of sealing tape sections 68 and the accompanying folding-over of barrier layer sections 70, 72. Each loop 50 comprises two substantially parallel legs and a curved part connecting the legs. The legs of loop 50 are formed by the subsections of the first and second barrier layer sections 70, 72 which are resting flat against the associated adjacent foam strips 26. In the area of connecting section 24, barrier layer sections 70, 72 form, after the folding-over of sealing tape sections 68, a curved part, so that the two legs of loop 50 come to rest against each other.

To connect two adjacent sealing tape sections 68 together, the two legs of loop 50 are bonded together. Preferably the legs of loop 50 are bonded together over their entire surfaces. A partial bond, however, can be sufficient to connect sealing tape sections 68. If sufficient pressure is exerted on foam-barrier layer web 32 in functional direction X, loop 50 can also be bonded in the curved part.

To form sealing element 74, it is also preferable for at least one first barrier layer section 70 and at least one second barrier layer section 72 to comprise a film material. Possible materials for such a film have already been described above in reference to the materials of first and second barrier layers 6, 10.

A wide variety of materials are available for the various parts discussed and illustrated herein. While the principles of this device have been described in connection with specific embodiments, it should be understood clearly that these descriptions are made only by way of example and are not intended to limit the scope of the device.

The invention claimed is:

1. A sealing element of flexible foam comprising:
a top surface, a bottom surface, and two side surfaces connecting the top surface to the bottom surface;
at least three sealing tape sections, which are arranged next to each other in a functional direction of the sealing element, wherein the functional direction is parallel to the top and bottom surfaces and perpendicular to the side surfaces;
at least one first barrier layer section and at least one second barrier layer section, each of which is arranged between two adjacent sealing tape sections;
wherein the at least one first barrier layer section and the at least one second barrier layer section connect adjacent sealing tape sections to each other and extend parallel to the side surfaces within the sealing element; the at least one first barrier layer section and the at least one second barrier layer section each form a loop between adjacent sealing tape sections; and the at least one first barrier layer section forms the loop in an area of the bottom surface of the sealing element, and the at least one second barrier layer section forms the loop in an area of the top surface of the sealing element.

2. The sealing element of claim 1 comprising several first barrier layer sections and/or several second barrier layer sections, wherein when viewed in the functional direction, a first barrier layer section and a second barrier layer section always occur in alternation.

3. The sealing element of claim 1 wherein the at least one first barrier layer section and the at least one second barrier layer section comprise a film.

4. The sealing element of claim 1 wherein each of the loops comprises two substantially parallel legs and a curved part connecting the legs, the two legs being bonded together.

\* \* \* \* \*